US010027150B2

(12) United States Patent
Kvols

(10) Patent No.: US 10,027,150 B2
(45) Date of Patent: Jul. 17, 2018

(54) RFI/EMI SHIELDING ENCLOSURE CONTAINING WIRELESS CHARGING ELEMENT FOR PERSONAL ELECTRONIC DEVICES SECURITY

(71) Applicant: David Kristian Kvols, Ashburn, VA (US)

(72) Inventor: David Kristian Kvols, Ashburn, VA (US)

(73) Assignee: SERENE DEVICES LLC, Tampa, FL (US)

( * ) Notice: Subject to any disclaimer, the term of this patent is extended or adjusted under 35 U.S.C. 154(b) by 62 days.

(21) Appl. No.: 15/185,041

(22) Filed: Jun. 17, 2016

(65) Prior Publication Data

US 2016/0372948 A1  Dec. 22, 2016

Related U.S. Application Data

(60) Provisional application No. 62/181,259, filed on Jun. 18, 2015.

(51) Int. Cl.
| *H02J 7/00* | (2006.01) |
| *H02J 7/02* | (2016.01) |
| *H02J 50/10* | (2016.01) |
| *H02J 50/40* | (2016.01) |

(52) U.S. Cl.
CPC ............ *H02J 7/0042* (2013.01); *H02J 7/025* (2013.01); *H02J 50/10* (2016.02); *H02J 50/40* (2016.02)

(58) Field of Classification Search
CPC .......... H02J 7/0042; H02J 7/025; H02J 50/10; H02J 50/40

USPC .......................................... 320/107–108, 114
See application file for complete search history.

(56) References Cited

U.S. PATENT DOCUMENTS

| 7,683,572 | B2 * | 3/2010 | Toya | H02J 7/0044 320/108 |
| 7,994,753 | B2 * | 8/2011 | Hankui | H01M 2/1066 320/112 |
| 8,188,714 | B2 * | 5/2012 | Petrick | G06F 1/182 320/107 |
| 8,503,182 | B2 * | 8/2013 | Petrick | G06F 1/1626 312/223.1 |
| 8,729,737 | B2 * | 5/2014 | Schatz | H03H 7/40 307/104 |
| 8,901,778 | B2 * | 12/2014 | Kesler | H03H 7/40 307/104 |
| 9,018,904 | B2 * | 4/2015 | Seyerle | B60R 16/033 320/113 |
| 9,300,162 | B2 * | 3/2016 | Lai | H02J 7/025 |
| 9,665,135 | B2 * | 5/2017 | Wong | G06F 1/182 |
| 2010/0264872 | A1 * | 10/2010 | Kwong | H02J 7/025 320/108 |

(Continued)

*Primary Examiner* — Stacy Whitmore
(74) *Attorney, Agent, or Firm* — Morris & Kamlay LLP

(57) ABSTRACT

The invention provides an electromagnetically shielded enclosure for personal electronic device security, comprising a lower enclosure having a receiving space for at least one electronic devices disposed on a base portion of the lower enclosure. An upper lid is structurally engaging with the whole lower enclosure to form an electromagnetically shielding structure. A wireless charging element is configured on the lower enclosure for wirelessly charging to provide power to at least one electronic device.

20 Claims, 21 Drawing Sheets

(56) References Cited

U.S. PATENT DOCUMENTS

| | | | | |
|---|---|---|---|---|
| 2011/0050164 A1* | 3/2011 | Partovi | | H01F 5/003 320/108 |
| 2012/0223676 A1* | 9/2012 | Petrick | | G06F 1/1628 320/115 |
| 2012/0319500 A1* | 12/2012 | Beart | | G06F 1/1632 307/104 |
| 2013/0119929 A1* | 5/2013 | Partovi | | H02J 7/025 320/108 |
| 2013/0154555 A1* | 6/2013 | Miller | | H02J 7/0042 320/108 |
| 2014/0021908 A1* | 1/2014 | McCool | | B60L 11/182 320/108 |
| 2014/0042971 A1* | 2/2014 | Seo | | H02J 17/00 320/114 |
| 2014/0265555 A1* | 9/2014 | Hall | | B60L 1/00 307/9.1 |
| 2014/0291397 A1* | 10/2014 | Caputo | | G06Q 10/087 235/385 |
| 2014/0375258 A1* | 12/2014 | Arkhipenkov | | H02J 7/025 320/108 |
| 2015/0137732 A1* | 5/2015 | Lai | | H02J 7/025 320/101 |
| 2015/0171658 A1* | 6/2015 | Manova-Elssibony | | H02J 7/025 320/108 |
| 2015/0222129 A1* | 8/2015 | McCauley | | H02J 5/005 307/104 |
| 2015/0326060 A1* | 11/2015 | Young | | H02J 7/0044 320/108 |
| 2016/0020639 A1* | 1/2016 | Pudipeddi | | H02J 7/025 320/108 |
| 2016/0042202 A1* | 2/2016 | Murray | | H02J 7/0042 320/108 |
| 2016/0081238 A1* | 3/2016 | Lee | | H01F 38/14 307/91 |
| 2016/0081239 A1* | 3/2016 | Lee | | H01F 38/14 307/91 |
| 2016/0105048 A1* | 4/2016 | Lee | | H02J 7/04 320/108 |
| 2016/0143194 A1* | 5/2016 | Yanagida | | B60L 11/1833 307/104 |
| 2016/0276865 A1* | 9/2016 | Pike | | B60R 11/0241 |
| 2016/0322852 A1* | 11/2016 | Yeh | | H02J 7/025 |
| 2016/0372975 A1* | 12/2016 | Jang | | H02J 50/10 |
| 2017/0018949 A1* | 1/2017 | Pudipeddi | | H02J 50/10 |
| 2017/0040830 A1* | 2/2017 | Jang | | H02J 7/025 |
| 2017/0053737 A1* | 2/2017 | Kurs | | H03H 7/40 |
| 2017/0140333 A1* | 5/2017 | Rinzler | | G06Q 10/087 |
| 2017/0187220 A1* | 6/2017 | Rosenfeld | | H02J 7/025 |
| 2017/0250563 A1* | 8/2017 | Davison | | H02J 7/025 |
| 2017/0257543 A1* | 9/2017 | Rowles | | H04N 5/2257 |
| 2017/0279294 A1* | 9/2017 | Fujii | | H02J 7/025 |

* cited by examiner

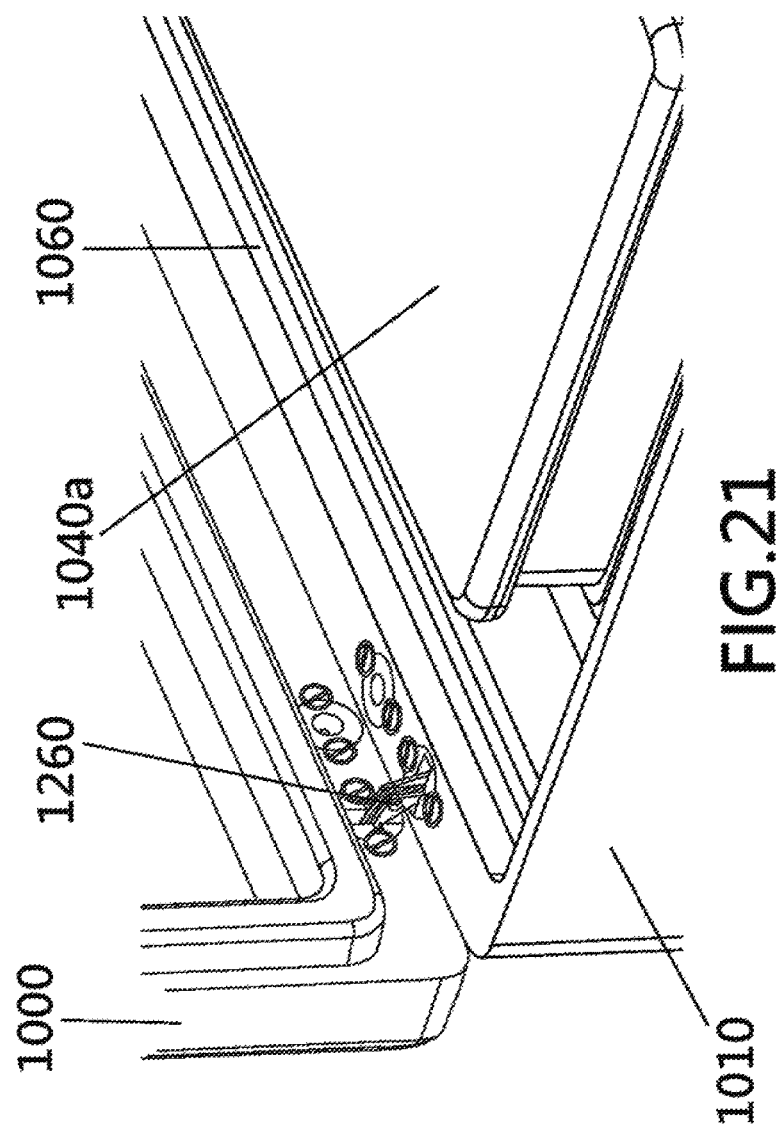

RFI/EMI SHIELDING ENCLOSURE CONTAINING WIRELESS CHARGING ELEMENT FOR PERSONAL ELECTRONIC DEVICES SECURITY

CROSS-REFERENCE TO RELATED APPLICATIONS

This application claims the benefit of the U.S. provisional patent application No. 62/181,259, filed Jun. 18, 2015.

TECHNICAL FIELD

The present invention generally relates to a security apparatus, more particularly, to an RFI/EMI shielding enclosure containing a wireless charging element for personal electronic devices.

BACKGROUND OF RELATED ARTS

Advances in smartphone technology have reached a point such that for many users such smartphones provide their primary access to the internet. It may even come to pass in the foreseeable future that such smartphones may replace to some extent standard desktop or laptop computer systems. Their small size allows these devices to be always accessible, becoming an invaluable tool for a variety of applications including social networking, GPS-based navigation, entertainment, communication in a variety of media, etc. Smartphones need an effective energy management solution. The core requirement for efficient energy management is a good understanding of where and how the energy is used. Usage scenarios of smartphones include audio playback, video playback, text messaging (such as Line Instant Message, Facebook social utility), phone calls, e-mailing, web browsing, etc. High energy usage for smartphones demands ready availability of energy sources in home and business settings.

However, the smartphone may also be used as recording tool during confidential business meetings, either deliberately or through remote activation by a malicious actor. In order to prevent confidential business materials from being compromised, many organizations do not allow access to mobile phones during meetings. However traditional solutions are not entirely effective in preventing malicious or inadvertent use of a smartphone to record confidential business information. In different scenarios, employee use of smartphones in meetings can distract from their attention to important discussions, or such use in the workplace can be detrimental to productivity. In the home, malicious or inadvertent use of a smartphone as a recording device can bring about an invasion of personal privacy. Family members' persistent use of smartphones may also distract from optimal attention to personal relations, as in the case of parental inattention to children. To address the security and productivity gaps in the traditional methodology, what is required is to provide a novel RFI/EMI shielding enclosure scheme for electronic devices which provides an incentive to use by providing an efficient energy management solution.

SUMMARY

The following presents a simplified summary of the disclosure in order to provide a basic understanding of certain aspects of the disclosure. This summary is not an extensive overview of the disclosure. It is not intended to identify key/critical elements of the disclosure or to delineate the scope of the disclosure. Its sole purpose is to present certain concepts of the disclosure in a simplified form as a prelude to the more detailed description that is presented later.

The invention solves the problem that people want to enhance security and prevent unauthorized theft and disclosure of confidential business information or invasions of personal privacy. One object of the claimed invention is to provide a security enclosure to preserve the smartphone therein. The enclosure includes EMI/RFI shielding ability. However, the smartphone will lose battery energy within the enclosure due to the smartphone continuously trying to search for an RF signal station. As energy provision to the smartphone is essential to its useful operation, one aspect of the claimed invention is to offer a charging element within the enclosure to charge the battery of the smartphone. Some smartphones reduce power consumption when unable to locate a signal station, such that the efficiency of the charging element is enhanced by its placement within an EMI/RFI enclosure. This combination of features provides the user two forms of simplicity: fewer wires, with no need for a charger; and disconnecting, with fewer distractions and mitigation of threats to business security and personal privacy.

EMI/RFI shielding cases should meet the dual requirements of: demand for wireless charging, and demand for security and privacy. While the enclosure is designed to be used simultaneously as a security enclosure and a wireless charger, it may be used with the lid open as a wireless charger, without providing EMI/RFI shielding. Alternately, it may be used solely as an EMI/RFI shielding case, without using the wireless charger function.

According to an aspect of the present invention, the present invention provides a security enclosure with EMI/RFI shielding, which consists of a lower enclosure and an upper lid which construct as a Faraday cage. The lower enclosure structurally engages with the upper lid in order for the smartphone to be preferably electromagnetically and/or electrostatically shielded. A concave space is defined between the lower enclosure and the upper lid (or within the lower enclosure) for receiving at least one electronic device, such as smartphone, which may be disposed on the base portion of the lower enclosure. The EMI/RFI shielding enclosure further comprises an EMI/RFI shielding gasket configured between the lower enclosure and the upper lid to ensure that the gap does not reduce shielding effectiveness. The EMI/RFI shielding enclosure may further include a non-shielding outer enclosures for receiving the lower enclosure and the upper lid. While the non-shielding outer enclosure is part of one embodiment of the invention, it is not necessary to function. One embodiment consists only of a single conductive enclosure, formed of a non-conductive material, to which a conductive coating is applied in order to form a Faraday cage. The wireless charging element is configured within the EMI/RFI shielding enclosure, for example configured between the lower enclosure and the upper lid for wirelessly charging to provide power to the electronic device.

According to an aspect of the present invention, the present invention provides an electromagnetically shielding enclosure for personal electronic device security, comprising a lower enclosure having a receiving space for at least one electronic devices disposed on a base portion of the lower enclosure; an upper lid structurally engaging with the whole lower enclosure to form an electromagnetically shielding structure; and a wireless charging element configured on the lower enclosure for wirelessly charging to provide power to at least one electronic device.

The lower enclosure consists of a lower non-shielding outer enclosure and an electromagnetically shielding conductive material coated on an interior portion of the lower non-shielding outer enclosure, and the upper lid consists of an upper non-shielding outer enclosure and an electromagnetically shielding conductive material coated on an interior portion of the upper non-shielding outer enclosure.

According to one aspect of the present invention, the present invention provides an electromagnetically shielding enclosure for personal electronic device security, comprising a lower enclosure having a receiving space for at least one electronic device; an upper lid structurally engaging with the whole lower enclosure to form an electromagnetically shielding structure; a shelf configured on the base portion of the lower enclosure to support at least one electronic devices; an electronics cover configured on a base portion of the lower enclosure; and a wireless charging element configured on the electronics cover for a wirelessly charging element to provide power to the at least one electronic devices.

The electromagnetically shielding enclosure further comprises a pair of hinges for engaging with the upper lid and the lower enclosure upper non-shielding outer enclosure.

A battery pack is configured between the wireless charging element and the electronics cover.

An electromagnetic locking mechanism is provided for an effective electromagnetic seal between the upper lid and the lower enclosure. The electromagnetic locking mechanism is activated by a sensor embedded in the anterior face of the enclosure.

BRIEF DESCRIPTION OF THE DRAWINGS

The components, characteristics and advantages of the present invention may be understood by the detailed descriptions of the preferred embodiments outlined in the specification and the drawings attached:

FIG. 21 illustrates an internal hinge of an EMI/RFI shielding enclosure device according to one embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a security enclosure with RFI (radio frequency interference)/EMI (electromagnetic interference) shielding structure, and the security enclosure includes a wireless charging element for personal electronic devices. The security enclosure shields the electronic device(s) contained therein from electromagnetic and radio-frequency signals. At the same time, it charges the electronic devices equipped with wireless charging receiver by use of a wireless charging transmitter coil contained within the same enclosure. It represents an improvement upon prior art for both shielding enclosures and wireless charging elements by combining both functions into a single device. Moreover, the lid and base for the enclosure and latching mechanism are constructed in such a way as to allow for easy access open/close or lift-on/lift-off by a user, whereas existing EMI/RFI enclosures have cumbersome access mechanisms (e.g. mechanical latches or screws).

The RFI/EMI shielding enclosure meets the demands of consumers who seek to moderate the pervasive use of mobile electronic devices, either through moderating their own usage, or through moderating usage by family members or friends in social settings, insofar as placing devices within the enclosure limits user access and prevents calls and signals that may prompt notifications from being received. It also meets the needs of consumers who require additional privacy, insofar as the enclosure shields the device contained therein from remote monitoring via radio, GPS, Bluetooth, or other RF frequencies. This application will be suitable to enterprise and institutional users that wish to limit transmissions from employee devices, or for boardroom or other workplace settings in which proprietary information is discussed. It also provides for a productivity enhancement, in that individuals can work without distraction while the device is in the enclosure, but also be ensured that their device is fully charged when it is removed to facilitate continued productivity while on-the-go.

In one embodiment, the electronic devices include, for example a mobile phone, a smartphone, a portable game console, a personal digital assistant (PDA), a notebook or a Tablet PC.

Figure 1:
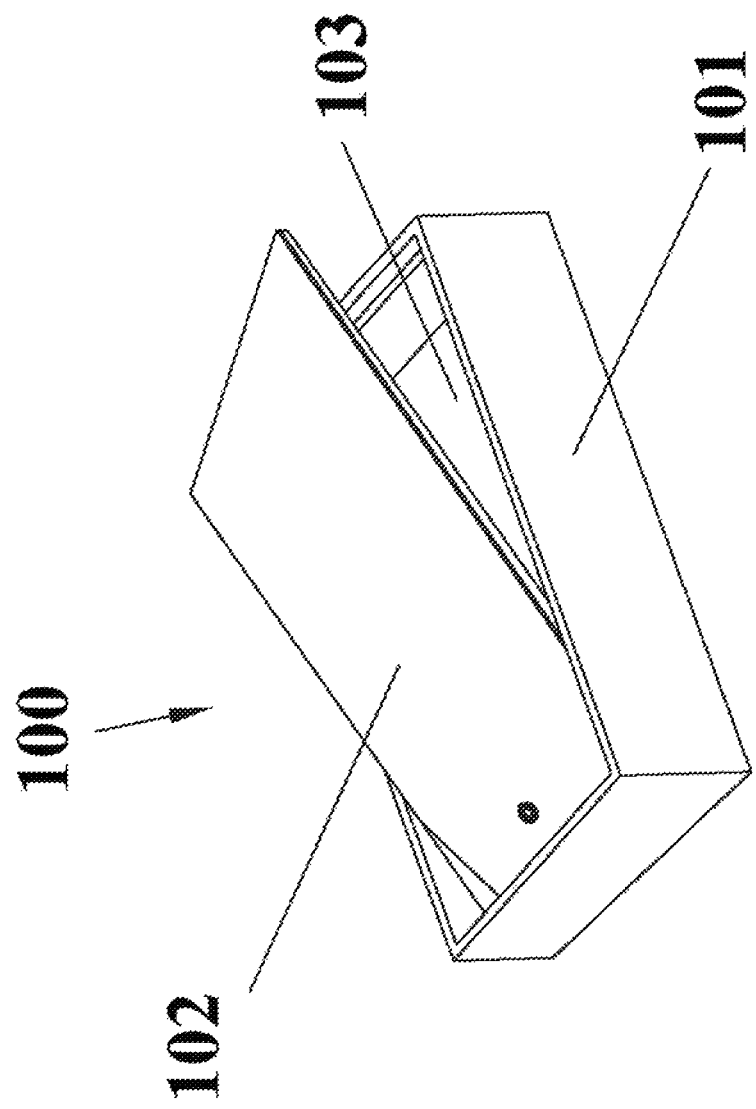
FIG. 1 illustrates an EMI/RFI shielding enclosure according to a first embodiment of the present invention.

FIG. 1 illustrates an EMI/RFI shielding enclosure according to a first embodiment of the present invention. In this embodiment, the EMI/RFI shielding enclosure 100 is consisted of a lower enclosure 101 and an upper lid 102, and the upper lid 102 is therefore structurally engaging with (and covering) the whole lower enclosure 101. The EMI/RFI shielding enclosure 100 is for example a Faraday cage. The lower enclosure 101 has four sidewalls and a base portion. In one embodiment, the lower enclosure 101 defines a first interlocking portion at two inner lateral sides of the four sidewalls of lower enclosure 101 to interlock a second interlocking portion at two lateral sides of the upper lid 102 by mechanical latches or screws such that the upper lid 102 is capable of pivoting along a parallel axis by pushing vertically to allow for easy access open/close by a user, and the lower enclosure 101 defines a concave space 103 for one electronic device (such as smartphone) disposed on the base portion of the lower enclosure 101. The shape of the enclosure 100 shown in FIG. 1 takes the form of a rectangular; however the invention is not limited in this respect. Those skilled in the art will appreciate how the present invention can be made to apply to a variety of three-dimensional volumes that define an enclosure. One smartphone can be disposed on the base portion of the lower enclosure 101 by pushing vertically (downwardly) front end of the upper lid 102 to open the EMI/RFI shielding enclosure 100, followed by pushing vertically (downwardly) rear end of the upper lid 102 to close the EMI/RFI shielding enclosure 100 for the smartphone to be preferably electromagnetically and/or electrostatically shielded. The lower enclosure 101 and the upper lid 102 are made of metallic material(s) or from any other suitable conductive material(s), substantially preventing RF transmission therethrough, e.g., to form an electrostatic shield (e.g., Faraday cage).

The Faraday cage may be inlaid in an outer enclosure, including but not limited to the following:

an outer case of wood or other ornamental, non-conductive material;

embedded in a conference table, bedside table, or other piece of furniture;

other outer functional elements not essential to or linked to the RFI/EMI shielding functionality of the interior enclosure, for example an LED clock display.

The security enclosure is constructed of a known EMI/RFI shielding material, possibly including but not limited to the conductive materials. It may also be constructed of other advanced materials such as EMI/RFI shielding foams, felts, fabrics, conductive plastics or thermoplastics (carbon fiber, stainless steel fiber, or nickel-coated carbon fiber in a thermoplastic matrix); or the security enclosure may be affected by use of shielding paints coating an otherwise non-conductive material (e.g. plastic or wood), or made conductive through metallization, electroless plating, conductive paints, sprays, or ferrites. Other materials for conducting the enclosure, cost permitting, may include carbon nanotubes, conductive films, inherently conductive polymers, or conductive elastomers.

Figure 2:
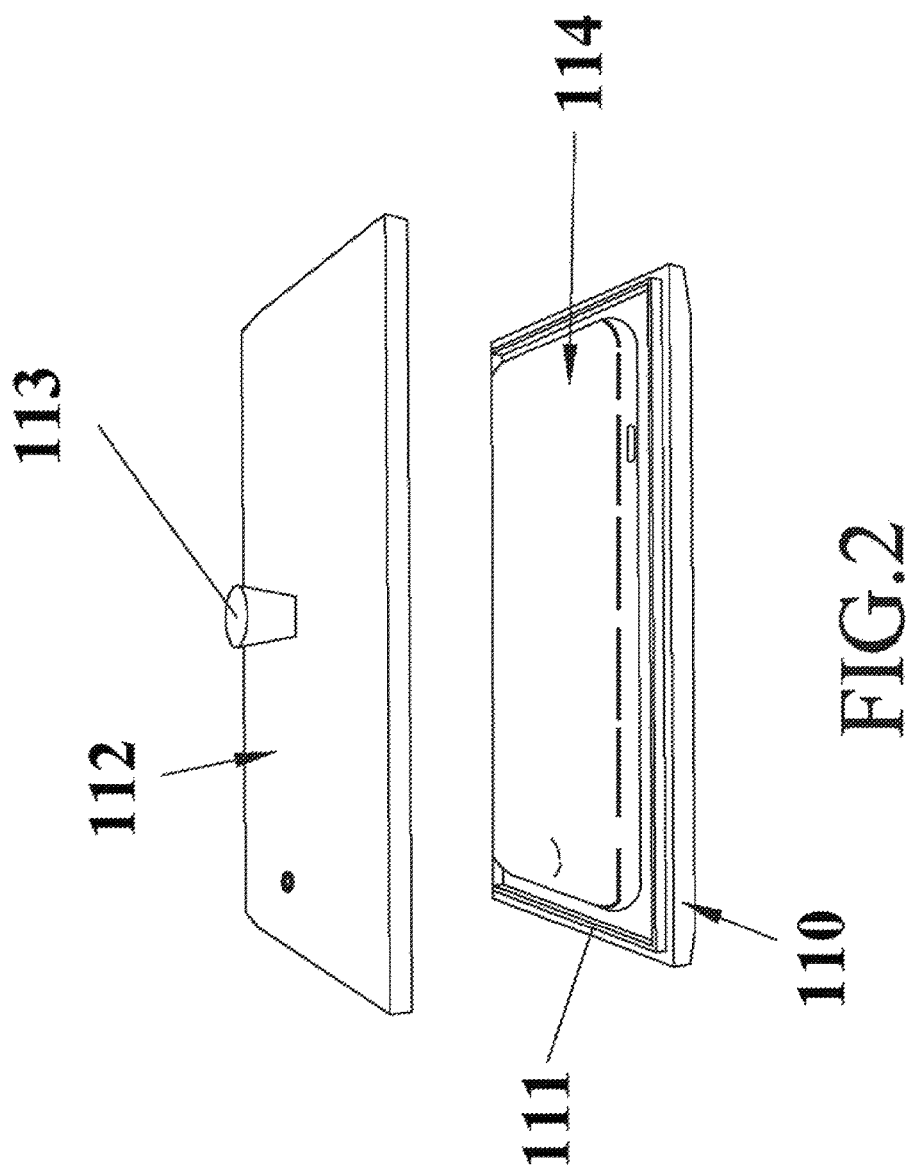
FIG. 2 illustrates an EMI/RFI shielding enclosure according to a second embodiment of the present invention.

FIG. 2 illustrates the security enclosure according to a second embodiment of the present invention. In this embodiment, the EMI/RFI shielding enclosure is consisted of a lower enclosure 110, an EMI/RFI shielding gasket 111 and an upper lid 112, and the EMI/RFI shielding gasket 111 is configured between the lower enclosure 110 and the upper lid 112 to ensure that the gap does not reduce shielding effectiveness. In this embodiment, the upper lid 112 is configured with a lift pin 113 fixed onto the upper lid 112 for lift-on/lift-off the EMI/RFI shielding enclosure. A concave space (within the lower enclosure 110) is defined between the lower enclosure 110 and the upper lid 112 for receiving one electronic device 114, such as smartphone, which may be disposed on the base portion of the lower enclosure 110. The smartphone 114 can be directly manually disposed on the base portion of the lower enclosure 110, followed by holding the lift pin 113 of the upper lid 112 to close (lift-on) the EMI/RFI shielding enclosure for the smartphone 114 to be preferably electromagnetically and/or electrostatically shielded. Similarly, the lower enclosure 111 and the upper lid 112 are made of metallic material(s) or from any other suitable material(s), substantially preventing RF transmission therethrough, e.g., to form an electrostatic shield (e.g., Faraday cage) for safety requirements.

In the present invention, the enclosure consists of a base and a lid. The lid may be either connected to the base by way of a hinge, or by way of a drawer slider, or other connection mechanism that similarly allows for opening and closing and ready access to the interior of the enclosure, while also maintaining EMI/RFI shielding effectiveness. The lid may also form a separate piece from the base. In any case, both lid and base (box) are constructed of EMI/RFI-shielding material. The lid must be of sufficient weight such that the force created by the weight of the lid and gravity where it connects with the base is sufficient to ensure an effective shielding seal.

Between lid and base (lower enclosure), an EMI/RFI shielding gasket may be interposed, to ensure that the gap between lid and base does not allow for entry of EMI/RFI. This may consist of any of the EMI/RFI shielding conductive materials. It may consist, for example, of commercially available copper-encased foam gaskets, in which the weight of the lid compresses the foam to form an effective shield. Or it may consist of other commercially available shielding materials, in which the shape of the gasket is designed so as to prevent the entry of EMI/RFI.

If a gasket is not used, other mechanical mechanisms may be used between lid and base (lower enclosure) to ensure EMI/RFI shielding performance. For example, contact ridges in the base section could be compressed by the lid, or convex extrusions from the outer edges of the lid, which mate with concave intrusions at the location where the lid contacts with the enclosure, spaced such no more than a quarter-wavelength apart for the areas of the RF spectrum that the box is designed to shield.

In one embodiment, the upper lid 112 consists of a non-shielding outer enclosure (e.g. of wood or plastic, for ornamental purposes and not essential to function of the enclosure contained therein) and an EMI/RFI shielding conductive material embedded into the concave portion of the non-shielding outer enclosure, such as metal inlay.

Figure 3:
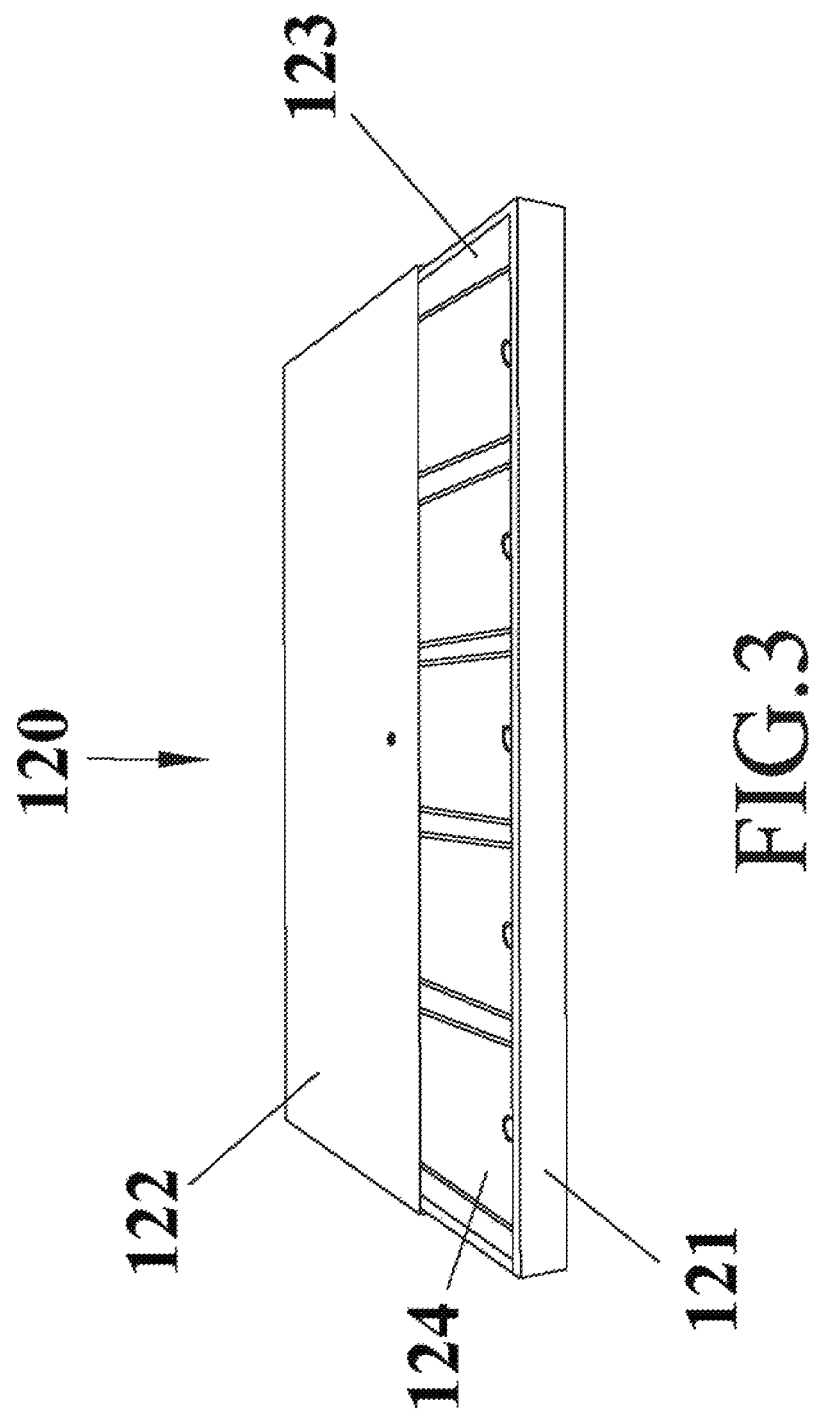
FIG. 3 illustrates an EMI/RFI shielding enclosure according to a third embodiment of the present invention.

FIG. 3 illustrates an EMI/RFI shielding enclosure according to a third embodiment of the present invention. In this embodiment, the EMI/RFI shielding enclosure 120 is consisted of a lower enclosure 121 and an upper lid 122, and the upper lid 122 is structurally engaging with (and covering) the whole lower enclosure 121. The EMI/RFI shielding enclosure 120 is a Faraday cage. The lower enclosure 121 has four sidewalls and a base portion. The EMI/RFI shielding enclosure 120 is a multiple device holder, and therefore the lower enclosure 121 defines a receiving (accommodating) space 123 for multiple electronic devices (such as multiple smartphones) 124 disposed on the base portion of the lower enclosure 121. The shape of the enclosure 120 shown in FIG. 3 takes the form of a rectangular; however the invention is not limited in this respect. Multiple smartphones 124 can be directly manually disposed on the base portion of the lower enclosure 121, followed by pushing rear end of the upper lid 122 for sliding along the top surface of the lower enclosure 121 to close the EMI/RFI shielding enclosure 120 for the multiple smartphones 124 to be preferably electromagnetically and/or electrostatically shielded. The lower enclosure 121 and the upper lid 122 are made of metallic material(s) or from any other suitable material(s), substantially preventing RF transmission therethrough, e.g., to form an electrostatic shield (e.g., Faraday cage) for safety requirements.

Figure 4:
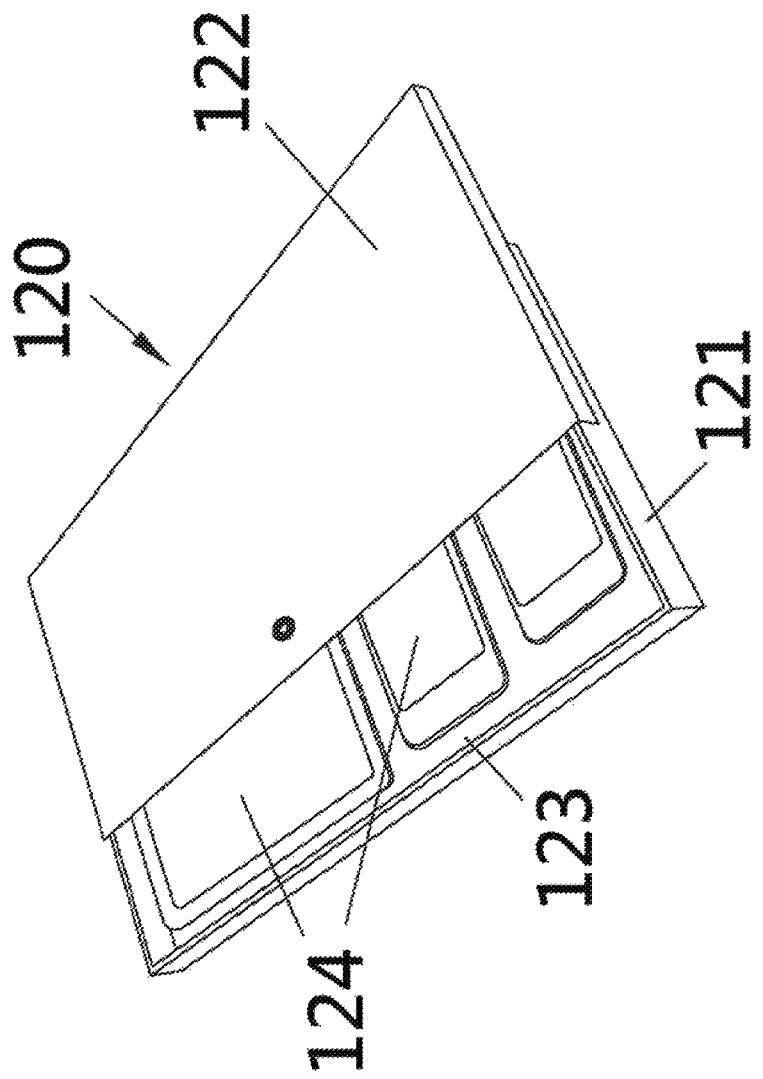
FIG. 4 illustrates an EMI/RFI shielding enclosure according to one embodiment of the present invention.

The receiving (accommodating) space 123 within the lower enclosure 121 can be holding for multiple electronic devices 124, such as five smartphones shown in FIG. 3 or two smartphones and one Tablet PC shown in FIG. 4.

In one embodiment, the lower enclosure 121 consists of a non-shielding outer enclosure (e.g. of wood or plastic) and an EMI/RFI shielding conductive material embedded into the concave portion of the non-shielding outer enclosure, such as the combination of inner aluminum and outer wood.

Figure 5:
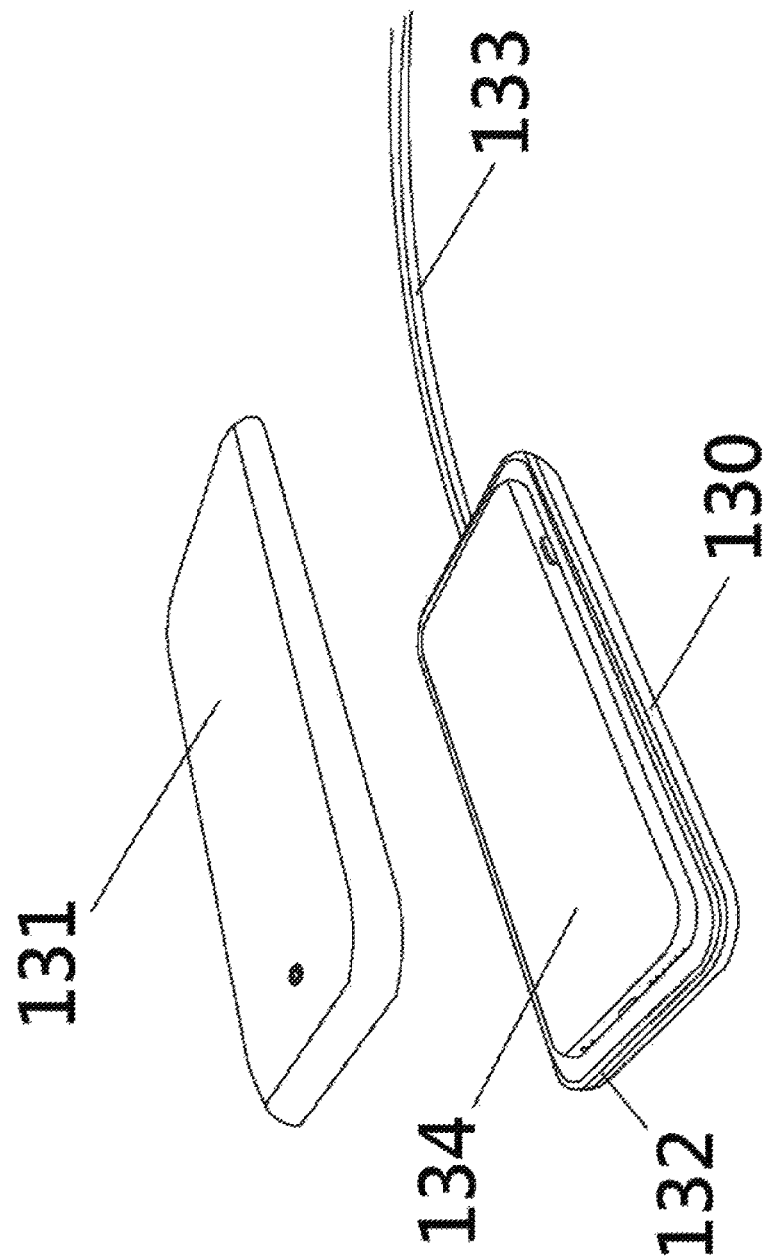
FIG. 5 illustrates an EMI/RFI shielding enclosure containing wireless charging element for personal electronic device according to one embodiment of the present invention.
Figure 6:
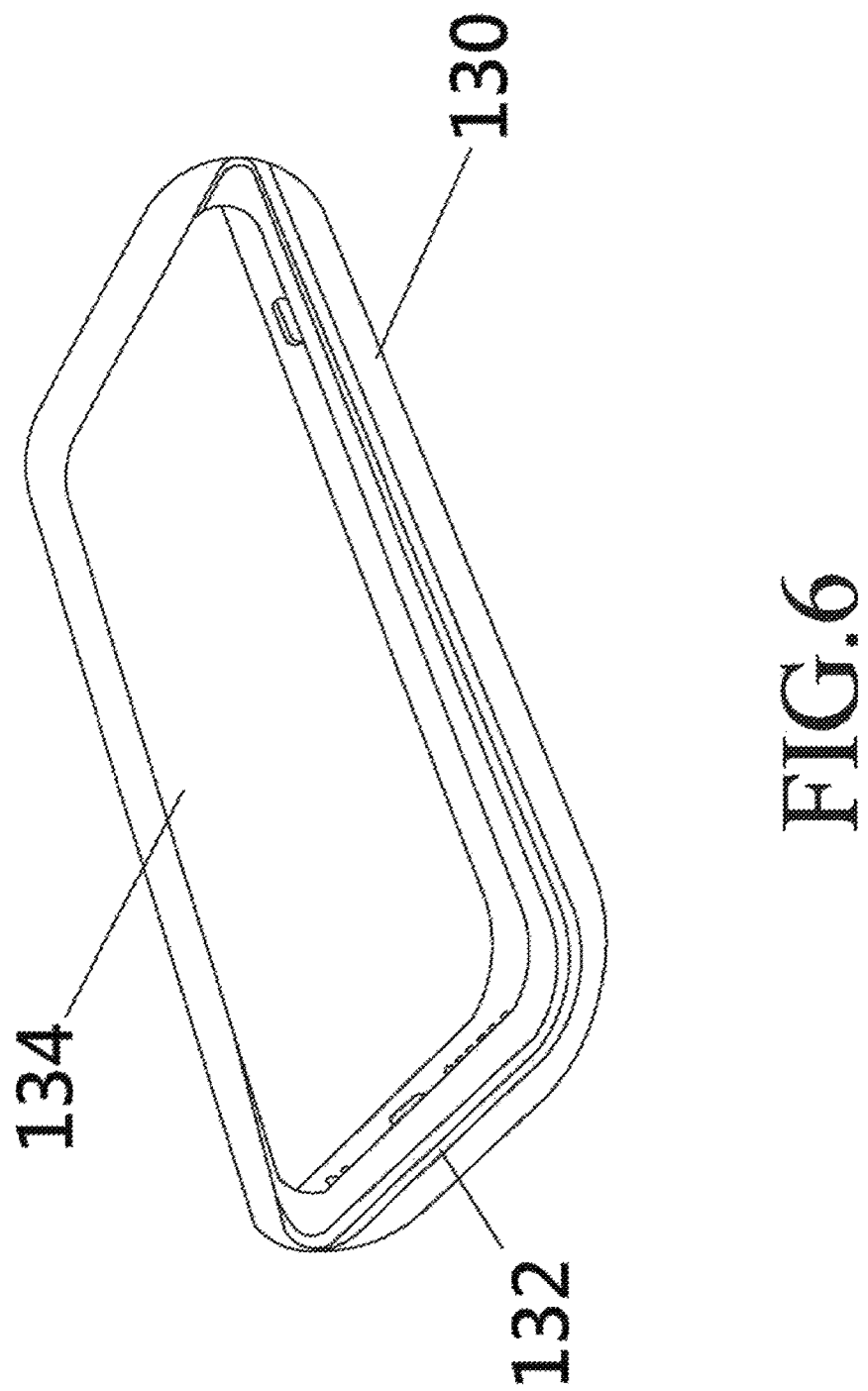
FIG. 6 illustrates a wireless charger for personal electronic device according to one embodiment of the present invention.

FIG. 5 illustrates an EMI/RFI shielding enclosure containing wireless charging element for personal electronic device according to one embodiment of the present invention. In this embodiment, the EMI/RFI shielding enclosure is consisted of a lower enclosure 130, an EMI/RFI shielding gasket 132 and an upper lid 131, and the EMI/RFI shielding gasket 132 is configured between the lower enclosure 130 and the upper lid 131 to ensure that the gap does not reduce shielding effectiveness. In this embodiment, the lower enclosure 130 is configured with a shielded cable 133 fixed via a shielded gland onto the rear end of the lower enclosure 130 for providing power to the wireless charging coil contained therein. In another embodiment, the electronic device is wirelessly charged by battery power supplied to the wireless charging coil contained within the enclosure, and therefore the charging cable is omitted, shown in FIG. 6. As shown in FIG. 5, it may be used with lid open as a wireless charger, without providing EMI/RFI shielding. A concave space is defined between the lower enclosure 130 and the upper lid 131 for one electronic device 134, such as smartphone, disposed on the base portion of the lower enclosure 130. The smartphone 134 can be directly manually disposed on the base portion of the lower enclosure 130, followed by holding the upper lid 131 and placing it upon the EMI/RFI shielding gasket 132 to close the EMI/RFI shielding enclosure for the smartphone 134 to be preferably electromagnetically and/or electrostatically shielded. The lower enclosure 130 and the upper lid 131 are made of metallic material(s) or from any other suitable material(s), substantially preventing RF transmission therethrough, e.g., to form an electrostatic shield (e.g., Faraday cage).

In one embodiment, a shielded gland is provided for passage of the power cable to wireless charging element between the shielded interior and the exterior of the enclosure. The power cable connector is configured on a side of the lower enclosure.

The enclosed wireless charging element receives power by way of a shielded USB or other power cable, which enters the EMI/RFI shielded enclosure through electromagnetically-shielded cable glands or entry shields. The cable gland or entry shield is flush with the exterior of the enclosure, to allow for a polished appearance, and provides for RF shielding irrespective of whether a cable is inserted or not.

In addition to, or in place of the EMI/RFI shielding materials described, an additional casing of magnetic permeable material may be constructed for the wireless charging element, insofar as such casing would prevent the coil from losing efficiency by incidental charging of the surrounding conductive materials in the EMI/RFI shielding enclosure. This would have the dual effect of shielding from low-frequency fields, and of shaping the electromagnetic field emitted by the wireless charging coil to enhance charging efficiency, by use of Mu metal or similar material.

The wireless charging element, composed of the elements described above, sits on the bottom of the enclosure base, within the enclosure, atop a shielding base, which forms the bottom of the charging element housing. The interior walls of the enclosure form the anterior, posterior, and lateral walls of the charging element housing. Above the pad there is a shelf flush with the interior walls of the enclosure, which forms the top of the charging element housing.

Figure 7:
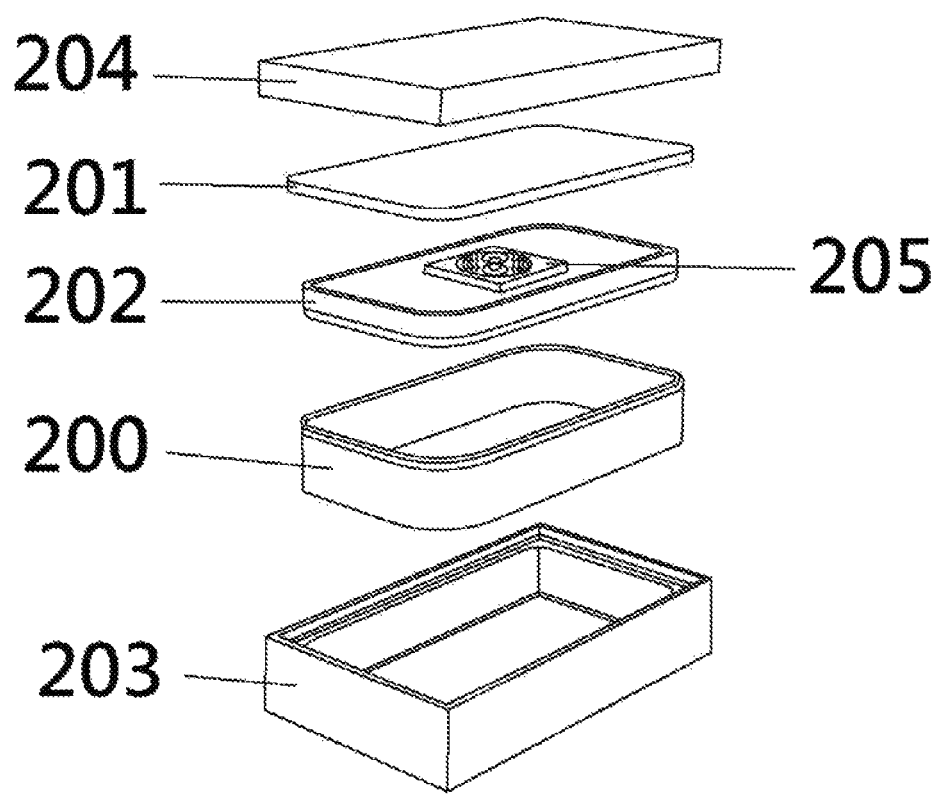
FIG. 7 illustrates an exploded drawing of an EMI/RFI shielding enclosure structure containing wireless charging element for personal electronic device according to one embodiment of the present invention.
Figure 8:
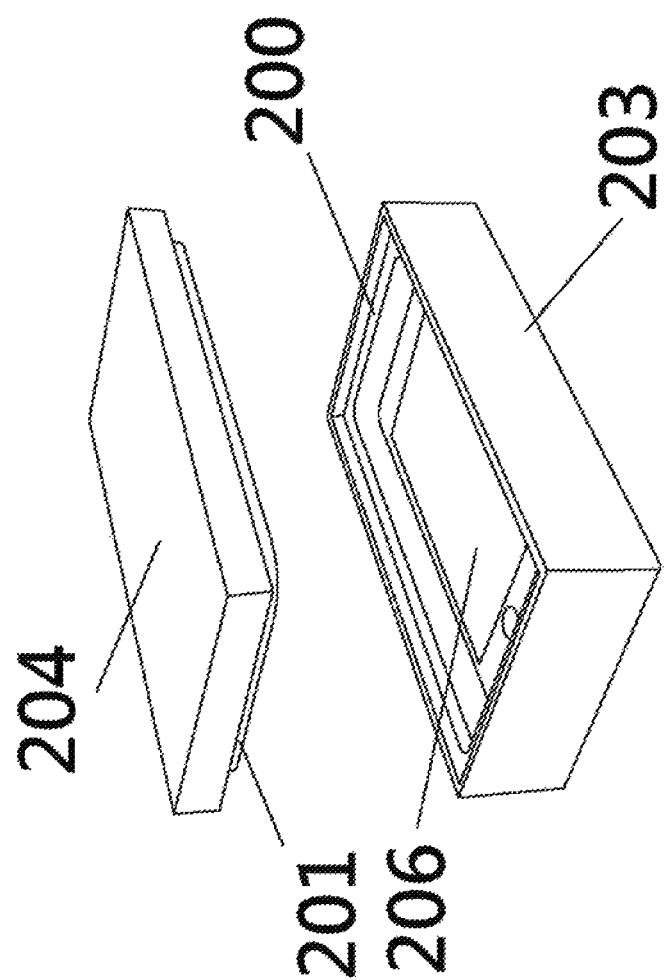
FIG. 8 illustrates an EMI/RFI shielding enclosure structure containing wireless charging element for personal electronic device according to one embodiment of the present invention.

FIG. 7 illustrates an exploded drawing of an EMI/RFI shielding enclosure structure containing wireless charging element for personal electronic device according to one embodiment of the present invention. In this embodiment, the EMI/RFI shielding enclosure structure is consisted of a lower enclosure 200, a wireless charging element 202, an upper lid 201, a lower non-shielding outer enclosure 203 and an upper non-shielding outer enclosure 204, which are independent components. The wireless charging element 202 is configured between the lower enclosure 200 and the upper lid 201 for wireless charging to provide power to the electronic device. The wireless charging element 202 is configured on the lower enclosure 200. In this embodiment, an EMI/RFI shielding gasket may be configured between the lower enclosure 200 and the upper lid 201 to ensure that the gap does not reduce shielding effectiveness. In this embodiment, a transmitter coil 205 is configured on the wireless charging element 202 for wirelessly transmitting power to the electronic device. A concave space (within lower enclosure 200) is defined between the lower enclosure 200 and the upper lid 201 for receiving one electronic device 206, such as smartphone, which may be disposed on the base portion of the lower enclosure 200, shown in FIG. 8. The upper lid 201 is configured/fixed under the upper non-shielding outer enclosure 204, and the lower enclosure 200 is configured/fixed on the lower non-shielding outer enclosure 203, shown in FIG. 8. The smartphone 206 can be directly manually disposed on the base portion of the lower enclosure 200, followed by holding the upper lid 201 to close the EMI/RFI shielding enclosure for the smartphone 206 to be preferably electromagnetically and/or electrostatically shielded. Similarly, the lower enclosure 200 and the upper lid 201 are made of metallic material(s) or from any other suitable material(s), substantially preventing RF transmission therethrough, e.g., to form an electrostatic shield (e.g., Faraday cage). The lower non-shielding outer enclosure 203 may be structurally engaged with the upper non-shielding outer enclosure 204 for receiving (or sealing tightly) the lower enclosure 200 and the upper lid 201. A concave space (within the lower non-shielding outer enclosure 203) is defined between the lower non-shielding outer enclosure 203 and the upper non-shielding outer enclosure 204 for receiving the lower enclosure 200 and the upper lid 201, shown in FIG. 8.

In one embodiment, the wireless charging element 205 comprises the following elements, a charging element housing (enclosed within the aforementioned EMI/RFI enclosure, located on the base portion of the same closure), a shielded cable, a transmitter (primary) coil and a matching capacitor, and a power transmitter control IC. The wireless charging element 205 is capable of shielding at the bottom face of the transmitter coil. Two basic methods for shielding at low frequencies are diversion of the magnetic flux with high-permeability materials such as ferrite or copper, and counteracting the magnetic flux by generating opposing flux according to Faraday's law.

Shielding may also be needed to encase the transmitter coil, so as to avoid the coil losing efficiency through transferring its charge to the conductive elements of the EMI/RFI enclosure, i.e. shielding 360 degrees around the coil, and at its bottom face, but not at the top face to allow connection with the receiving coil in the personal electronic device. The same shielding may increase the efficiency of the coil by directing the magnetic field more precisely towards the receiver coil.

If necessary for thermal considerations, the enclosure may also feature EMI/RFI-shielded vents (e.g. of copper mesh) to allow passive cooling of the charging element and the personal electronic device contained within the enclosure.

The EMI/RFI shielding enclosure consisting of the lower enclosure and the upper lid may be of a range of sizes, suitable for holding a range of personal electronic devices, for example, one cellular phone, or multiple cellular phones, a cellular phone and a tablet, or combinations of the preceding with wearable electronic devices. Separate trays may be used in the base of the enclosure to assist in positioning of the receiving device over the transmitter, if for example, an inductive charging element is used. A magnetic resonant charging element may also be used in lieu of an inductive charging element to allow for charging multiple devices at one time.

No limit is implied as to the size or shape of the enclosure. It may, for example, consist of a cabinet-type or furniture-embedded case with multiple doors opening perpendicular to the floor, each of which functions as a shielded lid as described below. The enclosure may be a standalone unit, or it may be mounted to the wall, or embedded in furniture, for example a conference table or bedside table. It may also be embedded in a drawer of a desk, or of a restaurant table.

Figure 9:
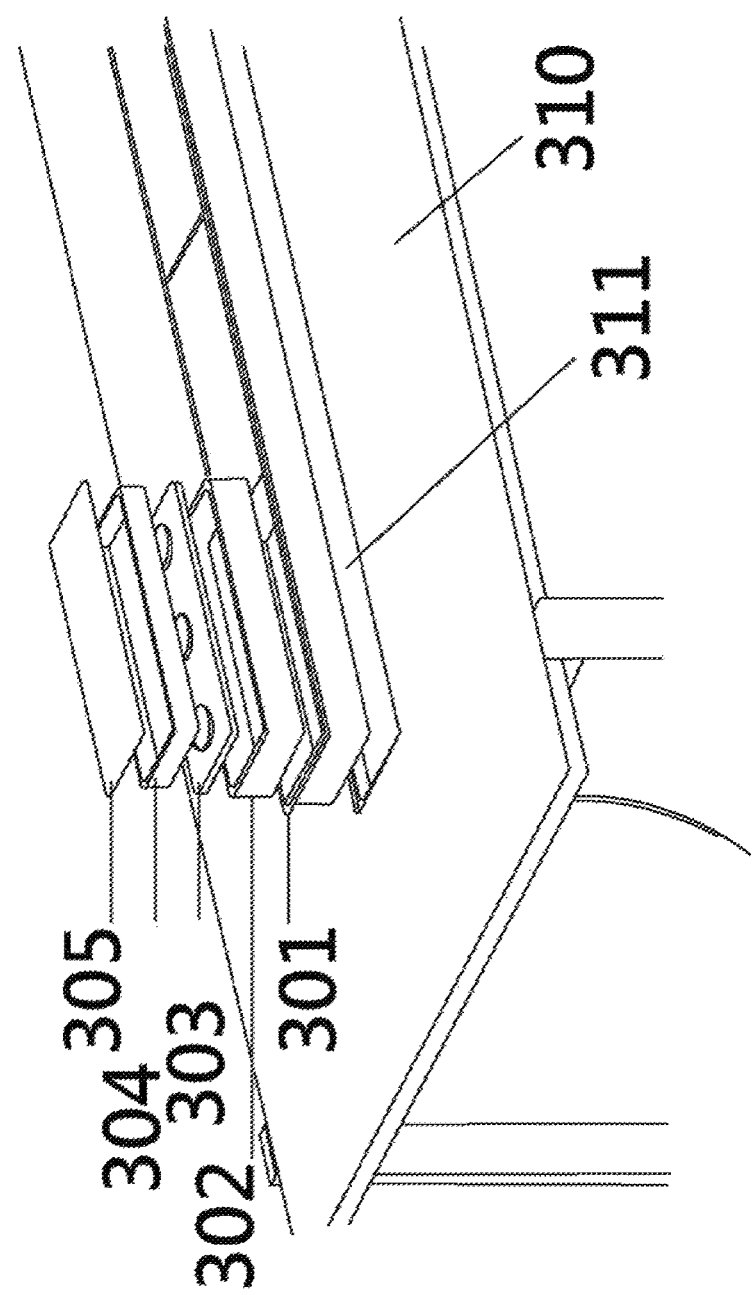
FIG. 9 illustrates an explored drawing of a furniture-embedded EMI/RFI shielding enclosure structure containing wireless charging element for personal electronic device according to one embodiment of the present invention.
Figure 10:
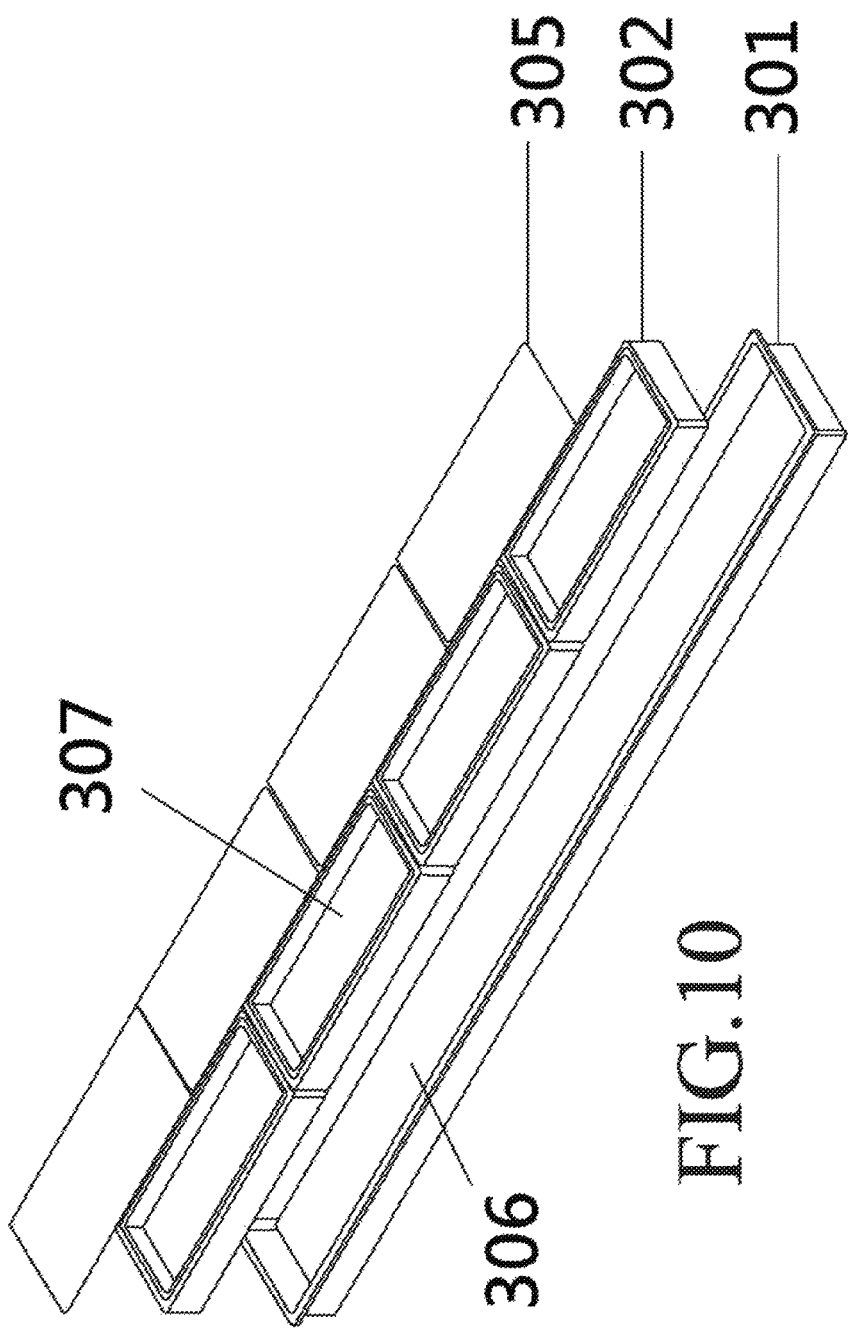
FIG. 10 illustrates an explored drawing of a furniture-embedded EMI/RFI shielding enclosure structure according to one embodiment of the present invention.

FIG. 9 illustrates an explored drawing of a cabinet-type EMI/RFI shielding enclosure structure containing wireless charging element for personal electronic device according to another embodiment of the present invention. In this embodiment, the furniture-embedded EMI/RFI shielding enclosure structure is consisted of a multiple set of EMI/RFI shielding enclosures, wherein each of the EMI/RFI shielding enclosures is a standalone unit which comprises a lower enclosure 302, a wireless charging element (transmitting device) 303, an upper lid 304, a lower non-shielding outer enclosure 301 and an upper non-shielding outer enclosure 305. In the furniture-embedded EMI/RFI shielding enclosure structure, the lower enclosure 302, the wireless charging element 303, the upper lid 304 and the upper non-shielding outer enclosure 305 are independent separate components in any set of the EMI/RFI shielding enclosure, and the lower non-shielding outer enclosure 301 is holding/receiving all the lower enclosures 302 of the multiple set of EMI/RFI shielding enclosures, shown in FIG. 10. The wireless charging element 303 is configured between the lower enclosure 302 and the upper lid 304 for wirelessly charging to provide power to the electronic devices. The wireless charging element 303 is a transmitting device for sending power to a receiver (with receiving coils) of the electronic device. In one embodiment, an EMI/RFI shielding gasket may be configured between the lower enclosure 302 and the upper lid 304. In this embodiment, multiples transmitter coils are configured on the wireless charging element 303 for wirelessly transmitting power to the multiple electronic devices. A concave space 307 (within the lower enclosure 302) is defined between the lower enclosure 302 and the upper lid 304 for receiving at least one electronic device, such as smartphone, which may be disposed on the base portion of the lower enclosure 302, shown in FIG. 10. The upper lid 304 may be configured/fixed under the upper non-shielding outer enclosure 305, and all the lower enclosures 302 may be disposed on the lower non-shielding outer enclosure 301. The smartphone can be directly manually disposed on the base portion of the lower enclosure 302, followed by holding the upper lid 304 to close the EMI/RFI shielding enclosure for the smartphone, to be preferably electromagnetically and/or electrostatically shielded. In one embodiment, the lower enclosure 302 and the upper lid 304 are made of metallic material(s) or from any other suitable material(s), substantially preventing RF transmission therethrough, e.g., to form an electrostatic shield (e.g., Faraday cage). The lower non-shielding outer enclosure 301 may be structurally engaged with the upper non-shielding outer enclosure 305 for receiving (or sealing tightly) the lower enclosure 302 and the upper lid 304. The lower non-shielding outer enclosure 301 has another concave space 306 for receiving/holding all the lower enclosures 302, shown in FIG. 10. The furniture-embedded EMI/RFI shielding enclosure structure may be embedded in a concave space 311 within a table 310, shown in FIG. 9.

Figure 11:
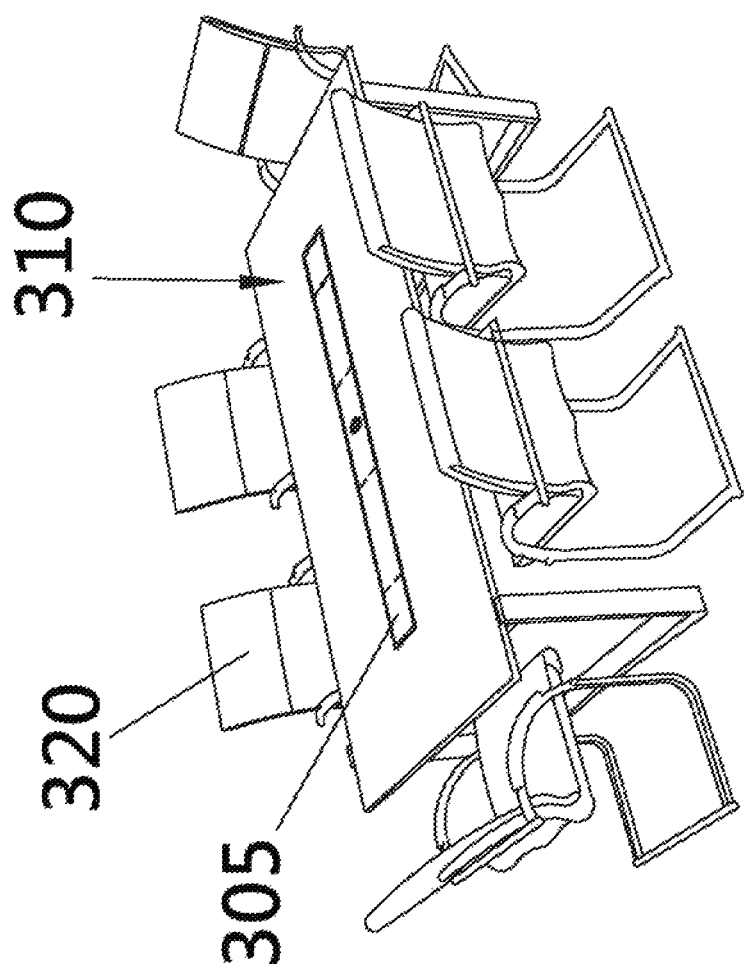
FIG. 11 illustrates a furniture-embedded EMI/RFI shielding enclosure structure embedded in a conference table according to one embodiment of the present invention.
Figure 12:
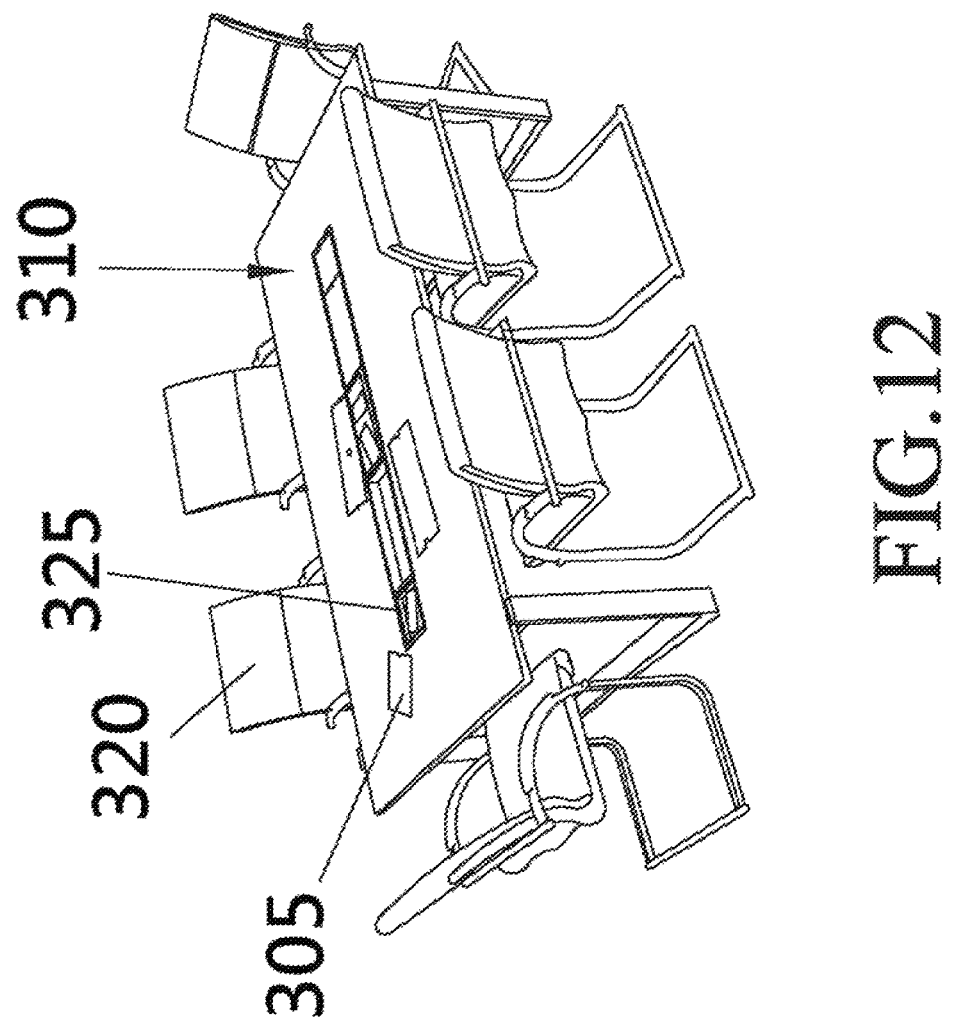
FIG. 12 illustrates a cabinet-type EMI/RFI shielding enclosure structure partitioned into four compartments embedded in a conference table according to one embodiment of the present invention.
Figure 13:
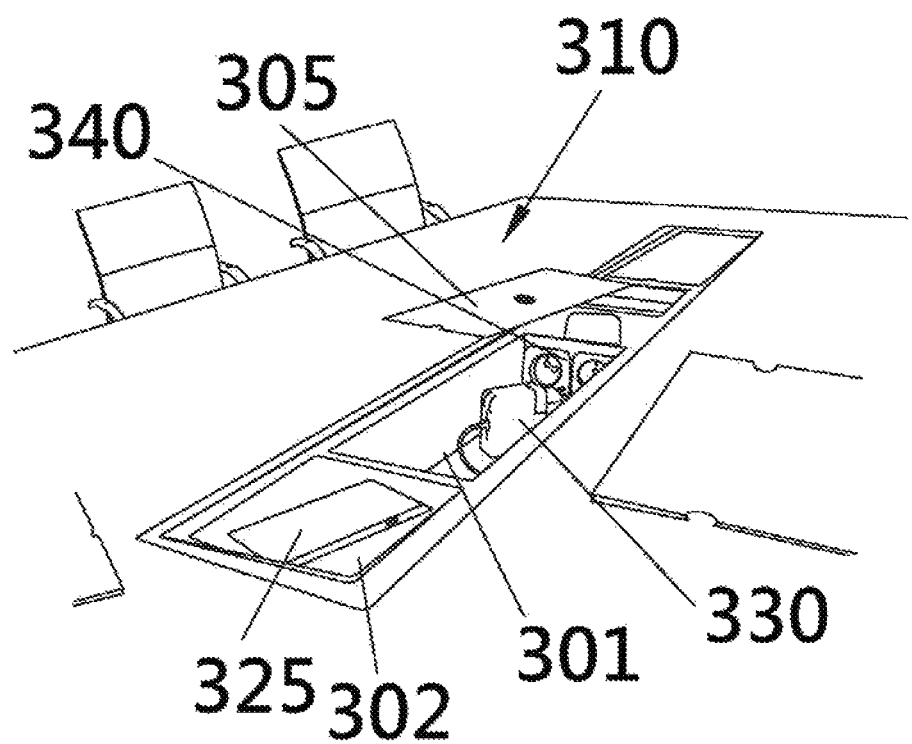
FIG. 13 illustrates a furniture-embedded EMI/RFI shielding enclosure structure partitioned into four compartments embedded in a conference table according to one embodiment of the present invention.

As shown in FIG. 11, it describes the furniture-embedded EMI/RFI shielding enclosure structure is embedded in a conference table 310 in a meeting room with plural seats 320 for participants. The cabinet-type EMI/RFI shielding enclosure structure is partitioned into four compartments, shown in FIG. 12. The second compartment is used for accommodating a charging (power) device 330, shown in FIG. 13. As the lower enclosure 302 of the furniture-embedded EMI/RFI shielding structure is embedded in the conference table 310, the upper portion of the enclosure 305 can be lifted off and at least mobile phone 325 can be disposed on the lower enclosure 302, shown in FIG. 12. The mobile phone 325 can be charged by the wireless charging element 303. In another embodiment, the mobile phone 325 can be charged by the charging (power) device 330 plugging into socket 340 configured on the cabinet-type EMI/RFI shielding enclosure structure, shown in FIG. 13.

In another embodiment, the transmitting device may also include a battery within the charging element housing to permit portable charging functionality. If a battery is used along with the wireless charging element to allow for portable charging, the battery sits within the same housing as the wireless charging coil. When the transmitting device is not plugged into external power, the battery provides power to the charging coil.

As noted above, multiple enclosures can be combined into a cabinet or locker-type structure, with individual compartments lockable by key, passcode, biometrics, etc. Such a variation could be used at workplaces that prohibit or limit use of personal electronic devices, or in public venues such as movie theaters.

The device may also communicate with the receiver via Bluetooth or near field communication (NFC) to a software application in the receiving device that logs the amount of time that the receiving device is contained within the enclosure, and that data can then be shared, for example via social media, or logged to meet goals and targets for "disconnected time".

In some embodiments, the lid may include a shielded window to maintain visual contact with the device, composed for example of shielded fiberglass or a shielded copper mesh. It may also include indicator lights to verify that the electronic device enclosed therein in is charging and/or not emitting or receiving RF signals.

Figure 14:
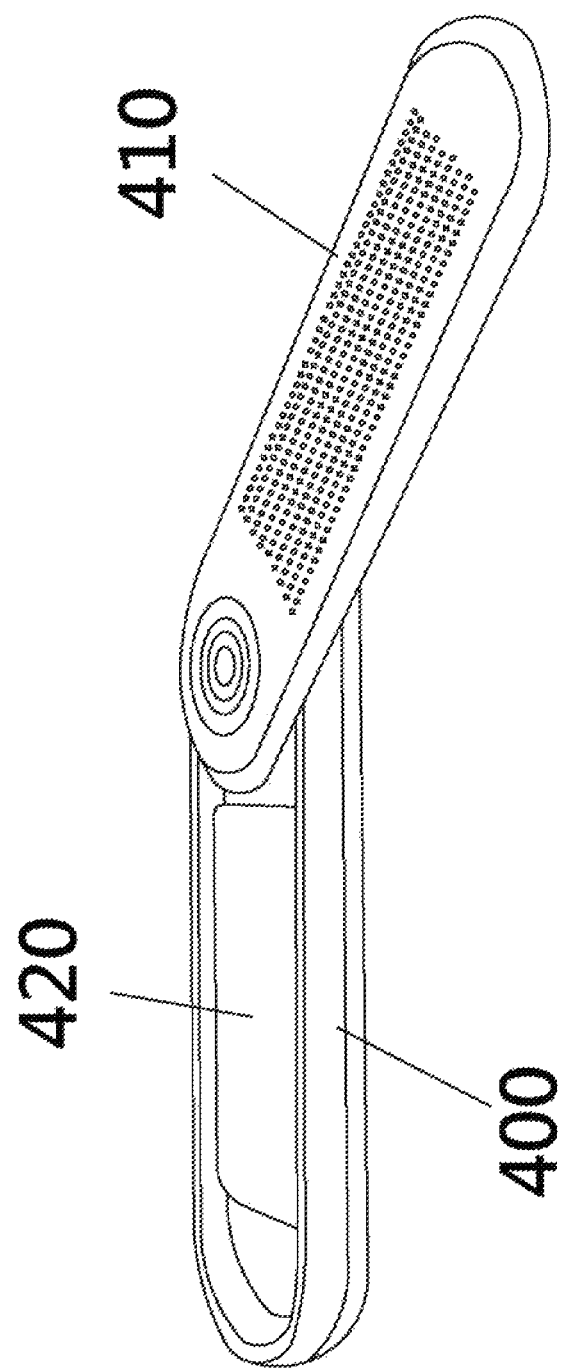
FIG. 14 illustrates an EMI/RFI shielding enclosure device according to one embodiment of the present invention.

As shown in FIG. 14, it describes an EMI/RFI shielding enclosure device. The device comprises a lower enclosure 400 and an upper lid 410. The device has an alarm function, for example using indicator lights to verify that the electronic device 420 enclosed therein in is charging and/or not emitting or receiving RF signals.

Figure 15:
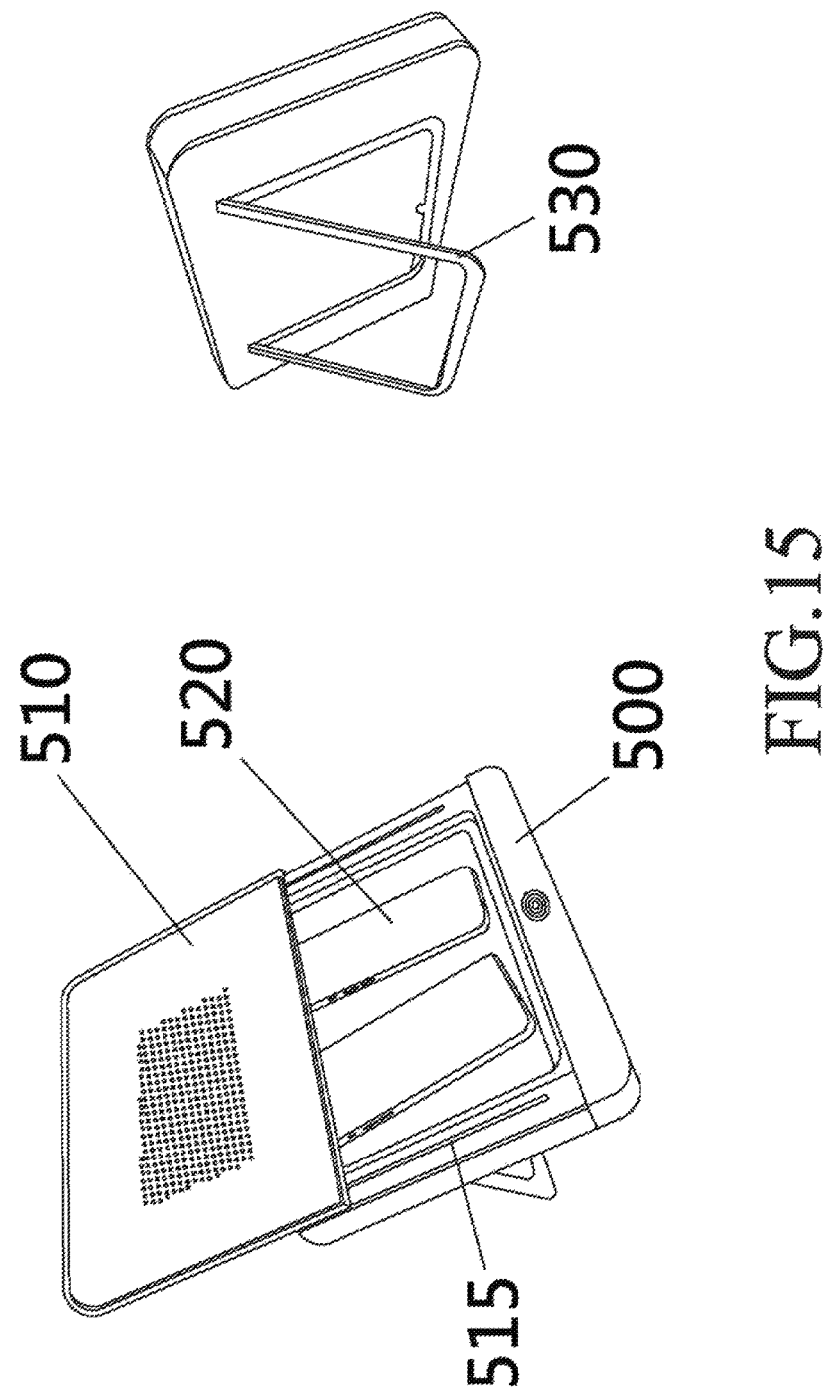
FIG. 15 illustrates an EMI/RFI shielding enclosure device according to another embodiment of the present invention.

As shown in FIG. 15, it describes a foldable EMI/RFI shielding enclosure device. The device comprises a lower enclosure 500 with a slide portion 515, an upper lid 510 and a folding support 530. Multiple electronic devices 520 can be directly manually disposed on the base portion of the lower enclosure 520, followed by pushing the lower enclosure 520 for sliding along the slide portion 515 to close the EMI/RFI shielding enclosure device for the multiple electronic devices 520 to be preferably electromagnetically and/or electrostatically shielded. The foldable EMI/RFI shielding enclosure device may be tilt (with an inclined angle) or flat by controlling the folding support 530.

Figure 16:
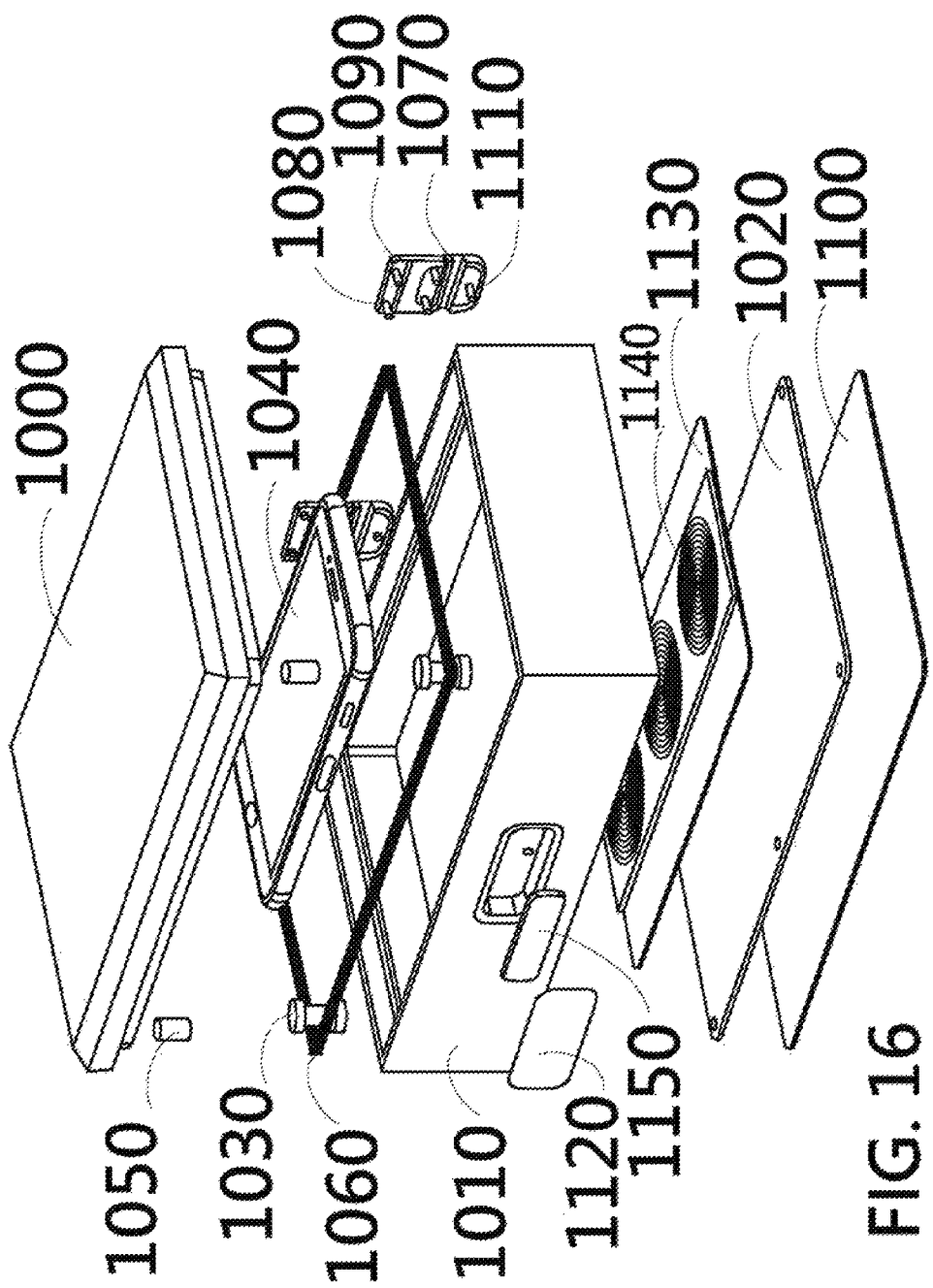
FIG. 16 illustrates an explored drawing of an EMI/RFI shielding enclosure device according to yet another embodiment of the present invention.
Figure 17:
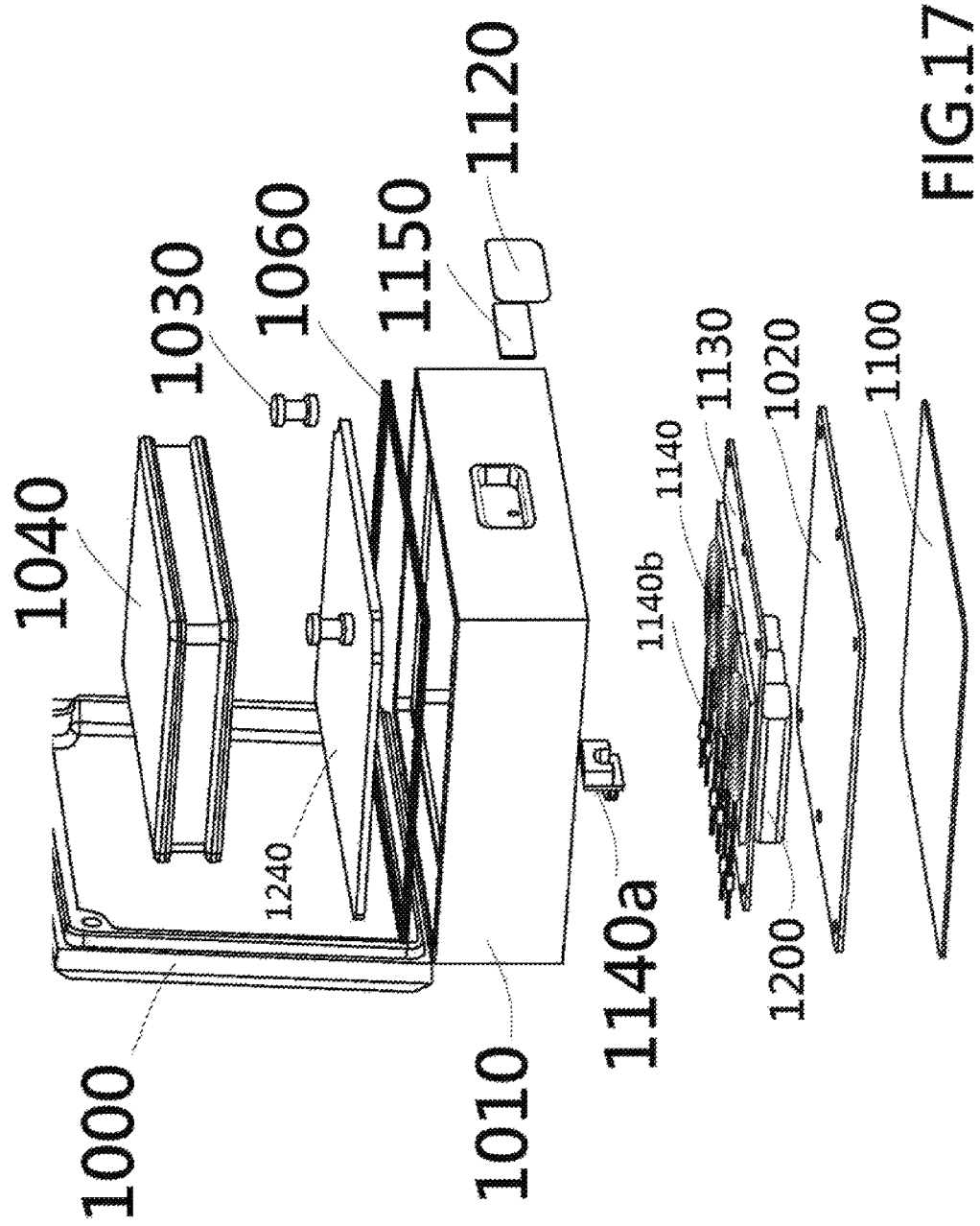
FIG. 17 illustrates an explored drawing of EMI/RFI shielding enclosure device according to one embodiment of the present invention.

FIG. 16 illustrates an exploded drawing of an EMI/RFI shielding enclosure structure containing wireless charging element for personal electronic device according to one embodiment of the present invention. In this embodiment, the EMI/RFI shielding enclosure structure comprises a lower enclosure 1010, an EMI/RFI gasket 1060, a wireless charging element 1130, an electronics cover 1020, an electronics cover matting 1100, and an upper cover 1000, which are independent components. The electronics cover 1020 is configured on a base portion of the lower enclosure 1010. The electronics cover 1020 is configured between the wireless charging element 1130 (battery pack 1200) and the electronics cover matting 1100, shown in FIG. 17. The electronics cover matting 1100 is configured on the electronics cover 1020 to mate with the bottom side of the lower enclosure 1010. In one example, the EMI/RFI shielding enclosure structure may further comprise an upper non-shielding outer enclosure configured on the upper cover 1000 (for example FIG. 7). In one example, the EMI/RFI shielding enclosure structure may further comprise a lower non-shielding outer enclosure for engaging with the lower enclosure 1010. The lower enclosure 1010 and the upper cover 1000 construct as a Faraday cage. In one embodiment, the interior portion (inner surface) of the lower enclosure 1010 and the interior portion (inner surface) of the upper cover 1000 are coated with conductive material to establish a Faraday cage.

A faraday cage is an enclosure formed by conductive materials, or by a mesh of the conductive materials. Faraday cages shield their contents from electrostatic fields. An electric field is defined as the force per unit charge. The direction of the field is taken to be the direction of the force it would exert on a positive test charge. Another way to describe it is to say that it is a force field acting on or around a particle. Faraday cages block the external charges from acting on internal particles. Not only does the Faraday cage block particles, but it also blocks electromagnetic radiation. The manner in which electromagnetic radiation travels is directly inhibited by the conductive material that makes up the cage. Essentially the faraday cage will act as a hollow conductor, redirecting the radiation about the surface of the enclosure.

The wireless charging element 1130 is configured above the electronics cover 1020 or the lower enclosure 1010 for wirelessly charging to provide power to an electronic device 1040. The electronic device 1040 is for example a smartphone, tablet, or PDA. The wireless charging element 1130 is for example a wireless charging Printed Circuit Board (PCB) assembly configured on the bottom surface of the lower enclosure 1010. In this embodiment, an EMI/RFI shielding gasket 1060 is for example a Form-In-Place (FIP) gasket, which may be configured between the lower enclosure 1010 and the upper cover 1000 to ensure that the gap does not reduce shielding effectiveness. The EMI/RFI shielding gasket 1060 may be an O-Ring/molded gasket, made of conductive elastomer. In this embodiment, a transmitter coil 1140 is configured on the wireless charging element 1130 for wirelessly transmitting power to the electronic device 1040. A concave space (within lower enclosure 1010) is defined between the lower enclosure 1010 and the upper cover 1000 for receiving one electronic device 1040, which may be disposed on the base portion of the lower enclosure 1010. The smartphone 1040 can be directly manually disposed on the base portion of the lower enclosure 1010, followed by holding the upper cover 1000 to close the EMI/RFI shielding enclosure for the smartphone 1040 to be preferably electromagnetically and/or electrostatically shielded. Similarly, the lower enclosure 1010 and the upper cover 1000 are made of metallic material(s), from nonmetallic materials with a conductive coating applied, or from any other suitable material(s), substantially preventing RF transmission therethrough, e.g., to form an electrostatic shield (e.g., Faraday cage).

Figure 18:
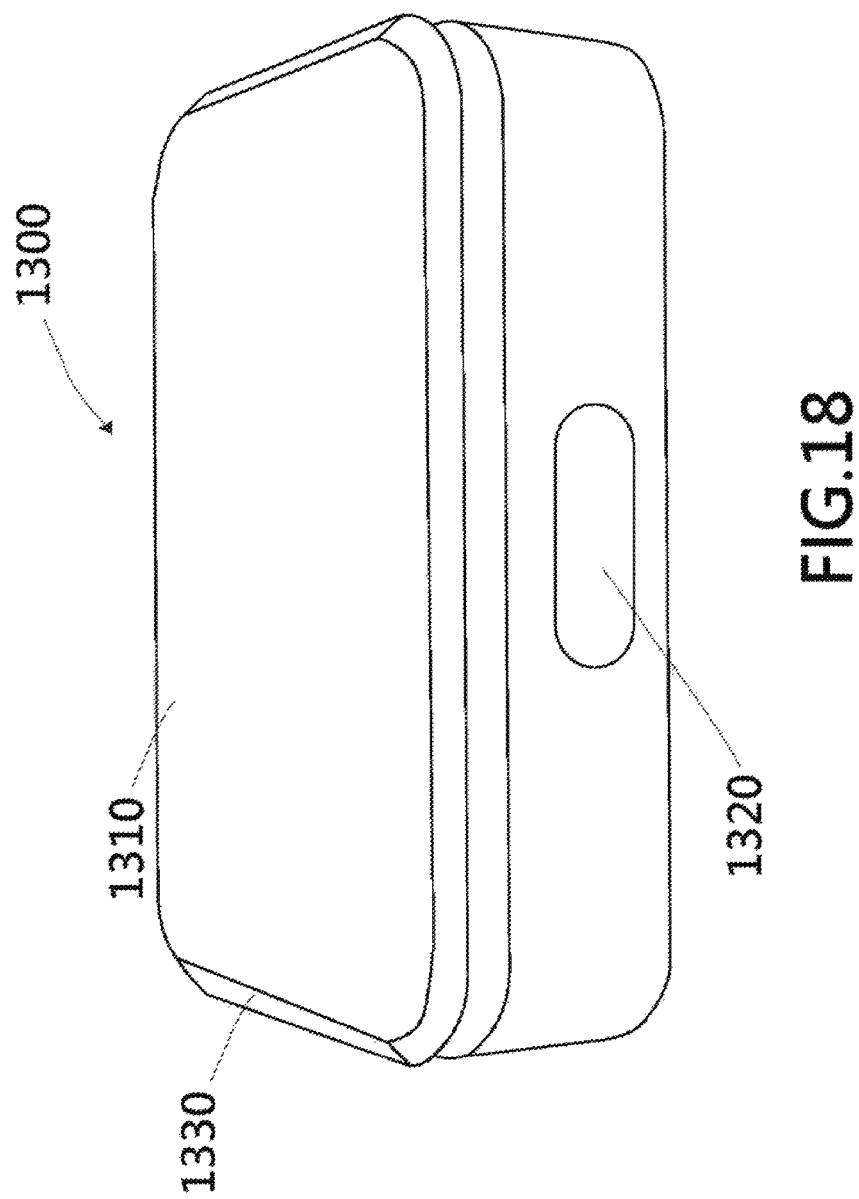
FIG. 18 illustrates an EMI/RFI shielding enclosure device according to another embodiment of the present invention.
Figure 19:
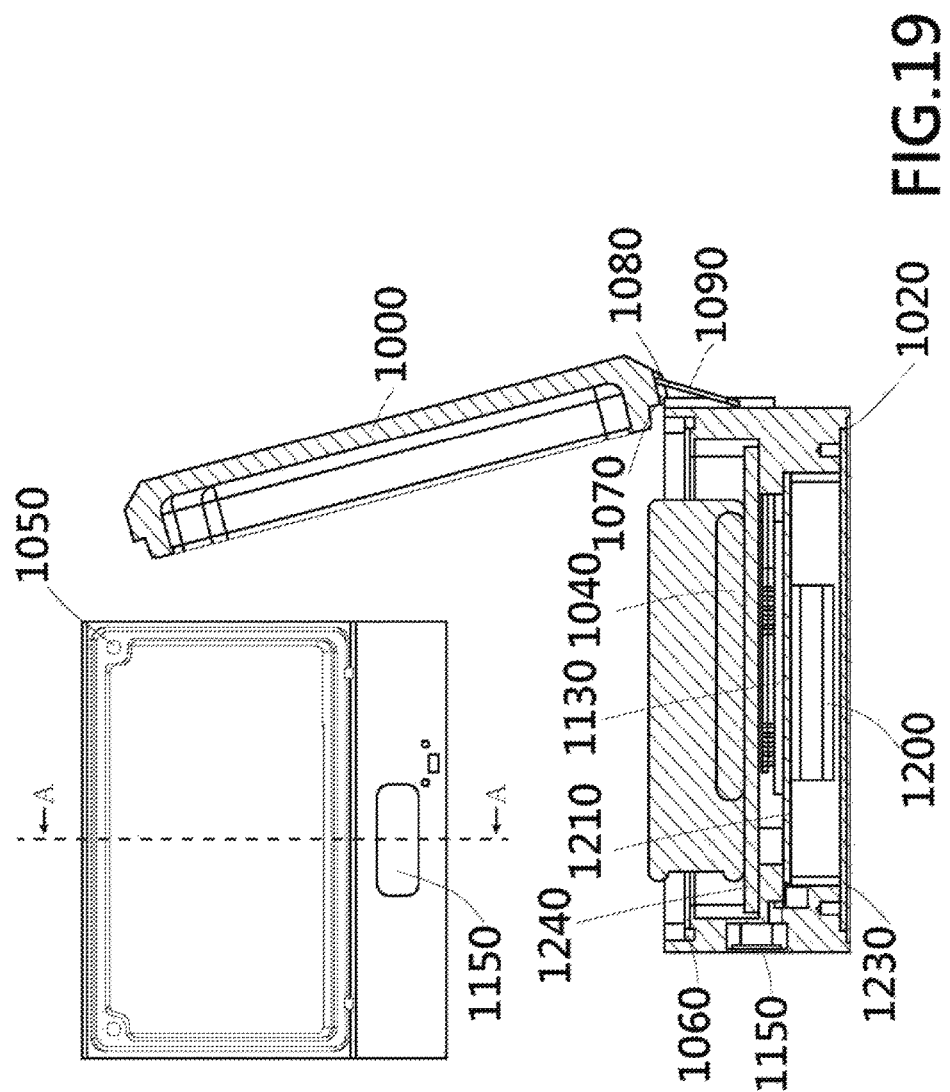
FIG. 19 illustrates an opened state of an EMI/RFI shielding enclosure device according to one embodiment of the present invention.

The EMI/RFI shielding enclosure structure further comprises a pair of hinges for engaging with the upper cover 1000 and the lower enclosure 1010. Each of the pair of hinges is consisted of a hinge bottom 1070, a hinge top 1080, a hinge ring 1090 and flat head screws 1110. Thus, the pair of hinges are configured for engaging with the upper cover 1000 and the lower enclosure 1010 by fixing the flat head screws 1110 into a sidewall of the upper cover 1000 and a sidewall of the lower enclosure 1010, shown in FIG. 19. As the hinge fixing process is finished, the upper cover 1000 of the EMI/RFI shielding enclosure structure may be opened and closed smoothly. FIG. 19 illustrates an opened state of the EMI/RFI shielding enclosure structure, along with A-A direction. A shelf 1240 is configured on the base portion of the lower enclosure 1010 to support the smartphone 1040, shown in FIG. 17 or FIG. 19. The wireless charging element 1130 and the battery pack 1200 are stacked/configured on the electronics cover 1020 which is configured on the electronics cover matting 1110. A bottom gasket 1230 is configured on the bottom side of the lower enclosure 1010, shown in FIG. 19. A ferrite magnet 1210 is configured under the wireless charging element 1130. In another embodiment, Computer Numerical Control (CNC) aluminum block 1300 is used to be as an EMI/RFI shielding enclosure structure, which comprises a wood inlay (upper non-shielding outer enclosure) 1310, a sensor 1320, a upper cover with a chamfered edge 1330 and an internal (hidden) hinge, shown in FIG. 18. For example, the sensor 1320 has three-color LED for indicating charging status. FIG. 18 illustrates a closed state of the EMI/RFI shielding enclosure structure.

The EMI/RFI shielding enclosure structure further comprises electromagnets 1030 and magnets 1050 for facilitating the upper cover 1000 completely engaging with the lower enclosure 1010. In other words, the invention creates a magnet locking mechanism to provide for an effective electromagnetic seal between the upper cover and the lower enclosure, while also providing convenient access for the user. In one example, the electromagnets 1030 and magnets 1050 may be configured on the lower enclosure 1010 and the upper cover 1000, respectively. Each of the electromagnets 1030 align to connect to each of the magnets 1050 for attracting with each other. The magnets 1050 are for example rare earth magnets.

Figure 20:
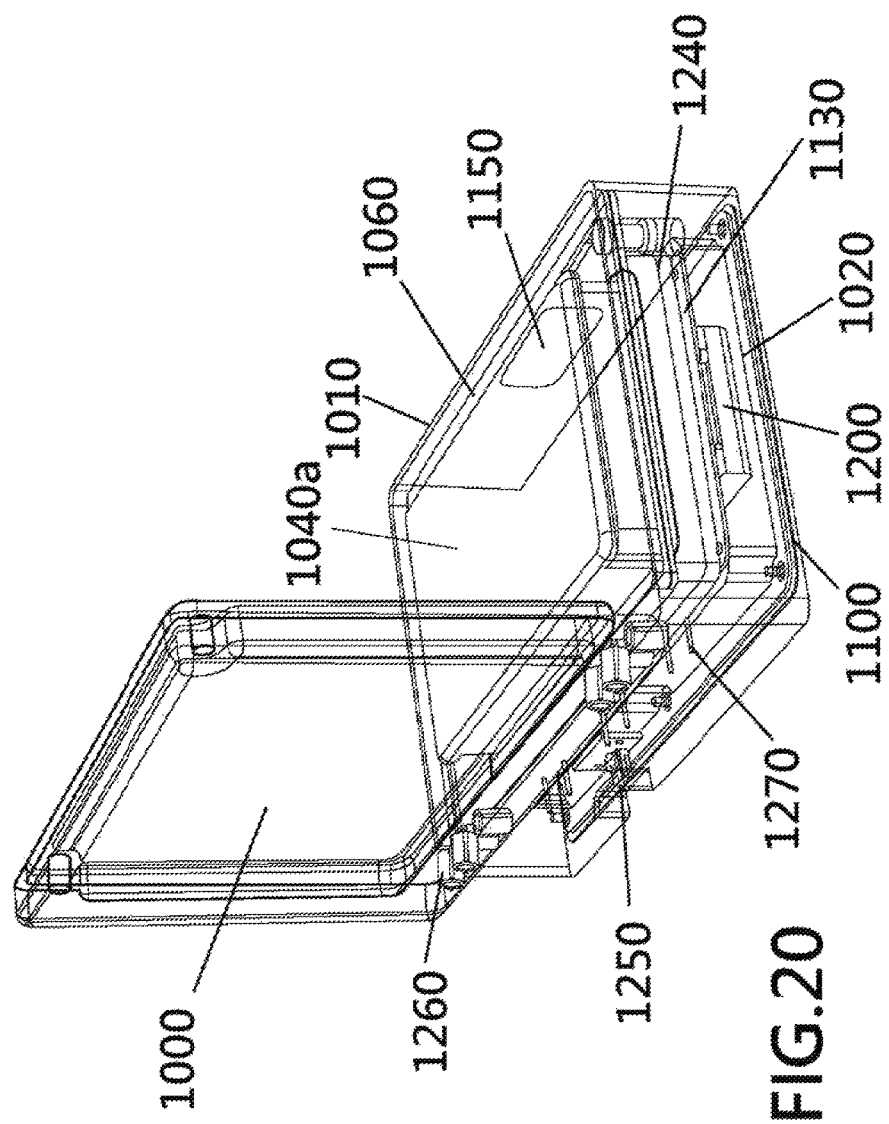
FIG. 20 illustrates an opened state of an EMI/RFI shielding enclosure device according to one embodiment of the present invention.

The EMI/RFI shielding enclosure structure further comprises a front glass 1120 and a touch status PCB 1150. A concave space is defined within the front side of the lower enclosure 1010 such that the front glass 1120 and the touch status PCB 1150 may be configured on the concave space. The front glass 1120 and the touch status PCB 1150 are constructed as a touch component. In one embodiment, the touch status PCB 1150 may be coupled to the wireless charging element 1130 for controlling wirelessly charging to provide power to the electronic device 1040. The touch status PCB 1150 may be coupled to the electromagnets 1030 as an on/off switch. A battery pack 1200 is configured on (under) the wireless charging element 1130 for providing power to a transmitter coil 1140 which is configured on the wireless charging element 1130 for wirelessly transmitting power to the electronic device 1040, wherein each of the transmission line 1140*b* of the transmitter coil 1140 is connected to a connector 1140*a* for the transmission line 1140*b* inserted into thereof, shown in FIG. 17. In one embodiment, the battery pack 1200 is used to drive the magnet locking mechanism 1030, and allows for operation even when not plugged in. In one embodiment, the EMI/RFI shielding enclosure further comprises a mini USB connector 1250 configured under the wireless charging element 1130 and on a side (backside) of the lower enclosure 1010, shown in FIG. 20. Therefore, the battery pack 1200 and the mini USB connector 1250 may be configured on (under) the wireless charging element 1130, shown in FIG. 20. The battery pack 1200 and the mini USB connector 1250 may be configured between the wireless charging element 1130 and the electronics cover 1020 on the electronics cover matting 1110. The mini USB connector 1250 consists of a mini USB PCB, a mini USB, and a USB PCB holding block. An internal hinge 1260 is configured on the lower enclosure 1010 and the upper cover 1000 for upper cover 1000 capable of closing and opening, shown in FIG. 21, while maintaining a flush exterior design, shown in FIG. 18. Thus, a mechanical locking element is provided to hold the upper cover 1000 for closing and opening. For example, the internal hinge 1260 adds a string/chain in the adjoining bolt hole to hold the upper cover 1000. A connection pin 1270 is coupled to the transmitter coil 1140 of the wireless charging element 1130, shown in FIG. 21. In one embodiment, the dimensions of the lower enclosure 1010 are sufficient to contain an electronic device enclosed by a case 1040*a*, shown in FIG. 21.

The invention can be operated according to the following description:

(a) To utilize the EMI/RFI shielding function of the enclosure, the user accesses the enclosure via the lid, which, depending on the lid design, may be released by de-activating the electromagnet latches via the touch sensor on the front of the enclosure, lifted off the top of the base, opened on a hinge upwards or laterally, or slid along drawer tracks. The user then places his personal electronic device within the enclosure. They then replace the lid and ensure that it returns firmly to its housing. Users can conduct a test to affirm that the device is not transmitting or receiving signals by, for example, placing a call to a cell phone contained within the enclosure. Depending on cellular phone carrier protocols, the caller will receive a not-available message, or the call will go directly to voicemail; the phone inside will not ring. The enclosure may thus be used for EMI/RFI shielding.

(b) To use the wireless charging function, the wireless charging receiver-enabled personal electronic device is placed within the enclosure and on the shelf that forms the top of the wireless charging element housing. When the device is placed on the charging element, it is charged via either electromagnetic induction or magnetic resonance. In the case of the former, the personal electronic receiving device must be positioned and oriented over the transmitting coil. In the case of the latter, multiple receiving devices may be placed over the transmitting coil, with more freedom in positioning and orientation.

(c) To achieve both the EMI/RFI shielding function, the receiving device is placed in the enclosure as described in (a). After the receiving device is coupled with the transmitting coil, as described in (b), the lid is replaced on the base as described in (a). Once these three actions are completed, the receiving device is charging wirelessly, while also being effectively shielding from transmitting RF signals out of the enclosure, or from receiving RF signals within the enclosure.

While the enclosure is designed to be used simultaneously as an EMI/RFI shielding enclosure and a wireless charger, as described in above (c), it may be used with the lid open as a wireless charger, without providing EMI/RFI shielding, as described in above (b). Alternately, it may be used solely as an EMI/RFI shielding case, without using the wireless charger function, as described in above (a). It may also be used in disaster preparation, though its reliability in shielding from electromagnetic pulse is unproven.

The invention can also be operated according to the following description:

(1) Use of conductive coatings on nonmetallic materials to establish a Faraday cage, thus achieving cost reduction and allowing for versatility of materials/design flexibility;

(2) Use of FIP or custom molded elastomer gaskets to allow for design flexibility;

(3) Addition of a magnet locking mechanism: creates an improvement over existing EMI/RFI chambers that are not engineered for easy access; provides for an effective electromagnetic seal, but without screws, etc.

(4) Battery pack to drive the magnet locking mechanism: allows for operation even when not plugged in.

(5) Optimized methods of mounting main the PCB and USB charging port.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. An electromagnetically shielding enclosure for personal electronic device security, comprising:
    a lower enclosure having a receiving space for at least one electronic device disposed on a base portion of said lower enclosure;
    an upper lid structurally engaging with whole said lower enclosure to form an electromagnetically shielding structure;
    a wireless charging element configured on said lower enclosure for wirelessly charging to provide power to said at least one electronic device; and
    a battery pack configured to drive a magnet locking mechanism and provide power to a transmitter coil to wirelessly transmit power to said at least one electronic device;
    a touch status printed circuit board (PCB) coupled to control said wireless charging element for wirelessly charging to provide power to said at least one electronic device, and coupled to said magnet locking mechanism.

2. The electromagnetically shielding enclosure of claim 1, wherein said lower enclosure consists of a lower non-shielding outer enclosure and an electromagnetically shielding conductive material coated on an interior portion of said lower non-shielding outer enclosure.

3. The electromagnetically shielding enclosure of claim 2, wherein said upper lid consists of an upper non-shielding outer enclosure and an electromagnetically shielding conductive material coated on an interior portion of said upper non-shielding outer enclosure.

4. The electromagnetically shielding enclosure of claim 1, wherein said lower enclosure is configured with a shielded cable fixed onto a rear end of said lower enclosure.

5. The electromagnetically shielding enclosure of claim 1, wherein said lower enclosure and said upper lid are made of metallic material.

6. The electromagnetically shielding enclosure of claim 1, wherein said transmitter coil is configured on said wireless charging element.

7. The electromagnetically shielding enclosure of claim 1, further comprising a power cable connector configured on a side of said lower enclosure.

8. The electromagnetically shielding enclosure of claim 1, further comprising an electromagnetically shielding gasket configured between said lower enclosure and said upper lid to ensure that a gap does not reduce shielding effectiveness.

9. The electromagnetically shielding enclosure of claim 1, wherein said upper lid is sliding along a slide portion of said lower enclosure to close said electromagnetically shielding enclosure.

10. The electromagnetically shielding enclosure of claim 1, wherein said lower enclosure has a slide portion for sliding by said upper lid to close said electromagnetically shielding enclosure.

11. An electromagnetically shielding enclosure for personal electronic device security, comprising:
    a lower enclosure having a receiving space for at least one electronic device;
    an upper lid structurally engaging with whole said lower enclosure to form an electromagnetically shielding structure;
    a shelf configured on a base portion of said lower enclosure to support said at least electronic device;
    an electronics cover configured on a base portion of said lower enclosure;
    a wireless charging element configured under said electronics cover for wirelessly charging to provide power to said at least one electronic devices;
    a battery pack configured to drive a magnet locking mechanism and provide power to a transmitter coil to wirelessly transmit power to said at least one electronic device; and
    a touch status printed circuit board (PCB) coupled to control said wireless charging element for wirelessly charging to provide power to said at least one electronic device, and coupled to said magnet locking mechanism.

12. The electromagnetically shielding enclosure of claim 11, wherein said lower enclosure consists of a lower non-shielding outer enclosure and an electromagnetically shielding conductive material coated on an interior portion of said lower non-shielding outer enclosure.

13. The electromagnetically shielding enclosure of claim 12, wherein said upper lid consists of an upper non-shielding outer enclosure and an electromagnetically shielding conductive material coated on an interior portion of said upper non-shielding outer enclosure.

14. The electromagnetically shielding enclosure of claim 11, further comprising an electronics cover matting matted on the bottom of said lower enclosure.

15. The electromagnetically shielding enclosure of claim 11, wherein said lower enclosure and said upper lid are made of metallic material.

16. The electromagnetically shielding enclosure of claim 11, further comprising a pair of hinges for engaging with said upper lid and said lower enclosure.

17. The electromagnetically shielding enclosure of claim 11, wherein said wireless charging element includes a housing, a shielded cable, said transmitter coil and a matching capacitor, and a power transmitter control IC.

18. The electromagnetically shielding enclosure of claim 11, further comprising a power cable connector configured on a side of said lower enclosure.

19. The electromagnetically shielding enclosure of claim 11, wherein a front glass and said touch status PCB are configured on a concave space defined within a front side of said lower enclosure.

20. The electromagnetically shielding enclosure of claim 11, wherein said magnet locking mechanism is configured between said upper lid and said lower enclosure.

* * * * *